US012574453B2

(12) United States Patent
Son et al.

(10) Patent No.: US 12,574,453 B2
(45) Date of Patent: Mar. 10, 2026

(54) ELECTRONIC DEVICE AND OPERATING METHOD FOR PERFORMING COMMUNICATION CONNECTION WITH PERIPHERAL DEVICE

(71) Applicant: SAMSUNG ELECTRONICS CO., LTD., Suwon-si (KR)

(72) Inventors: Dongil Son, Suwon-si (KR); Doosuk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 611 days.

(21) Appl. No.: 17/876,121

(22) Filed: Jul. 28, 2022

(65) Prior Publication Data

US 2022/0385755 A1     Dec. 1, 2022

Related U.S. Application Data

(63) Continuation of application No. PCT/KR2021/018284, filed on Dec. 3, 2021.

(30) Foreign Application Priority Data

Dec. 4, 2020     (KR) ......................... 10-2020-0168631

(51) Int. Cl.
*H04M 1/72409*        (2021.01)
*H04M 1/02*           (2006.01)
(Continued)

(52) U.S. Cl.
CPC ..... *H04M 1/72409* (2021.01); *H04M 1/0268* (2013.01); *H04W 76/10* (2018.02); *H04W 76/30* (2018.02)

(58) Field of Classification Search
CPC ............ H04M 1/0268; H04M 1/0245; H04M 1/6066; H04M 1/0235; H04W 76/10; H04W 76/14; H04B 1/40; H04B 1/18
See application file for complete search history.

(56) References Cited

U.S. PATENT DOCUMENTS 9,395,815 B2     7/2016  Lim et al.
11,838,433 B1*  12/2023  Kumar Agrawal . H04M 1/0235
(Continued)

FOREIGN PATENT DOCUMENTS

KR     10-2010-0009008 A     1/2010
KR     10-2010-0019164 A     2/2010
(Continued)

OTHER PUBLICATIONS

Communication dated Mar. 24, 2022, issued by the International Searching Authority in counterpart International Application No. PCT/KR2021/018284 (PCT/ISA/210).
(Continued)

*Primary Examiner* — Khalid W Shaheed
(74) *Attorney, Agent, or Firm* — Sughrue Mion, PLLC

(57)     ABSTRACT

An electronic device may include a first housing, a second housing, at least one wireless communication circuit, and at least one processor. When the electronic device is in the first form, the at least one processor may establish a wireless communication connection with a first peripheral device mapped to the first form using the at least one wireless communication circuit, and obtain that the electronic device
(Continued)

changes from the first form to the second form using the at least one sensor, and in response to changing to the second form, establish a wireless communication connection with a second peripheral device mapped to the second form using the at least one wireless communication circuit. In addition to this, various embodiments understood through the specification are possible.

20 Claims, 16 Drawing Sheets

(51) Int. Cl.
H04W 76/10 (2018.01)
H04W 76/30 (2018.01)

(56) References Cited

U.S. PATENT DOCUMENTS

| | | | |
|---|---|---|---|
| 2010/0011291 A1 | 1/2010 | Nurmi | |
| 2014/0359454 A1 | 12/2014 | Lee et al. | |
| 2015/0227164 A1* | 8/2015 | Laycock | G06F 1/1652 |
| | | | 345/82 |
| 2017/0221456 A1 | 8/2017 | Kim et al. | |
| 2018/0101199 A1 | 4/2018 | Myung et al. | |
| 2019/0097178 A1* | 3/2019 | Cho | H10K 59/8791 |
| 2019/0245955 A1* | 8/2019 | Lee | H04M 1/0268 |
| 2019/0261519 A1* | 8/2019 | Park | H04M 1/0235 |
| 2019/0339742 A1* | 11/2019 | Jia | G06F 1/1681 |
| 2020/0177714 A1 | 6/2020 | Jung et al. | |
| 2022/0179546 A1* | 6/2022 | Zhu | G06F 3/0481 |

FOREIGN PATENT DOCUMENTS

| | | | |
|---|---|---|---|
| KR | 10-2013-0113895 A | 10/2013 |
| KR | 10-2014-0008177 A | 1/2014 |
| KR | 10-2014-0141967 A | 12/2014 |
| KR | 10-2015-0072505 A | 6/2015 |
| KR | 10-2017-0090851 A | 8/2017 |
| KR | 10-2018-0039854 A | 4/2018 |
| KR | 10-1971200 B1 | 4/2019 |
| KR | 10-2019-0050944 A | 5/2019 |
| KR | 10-2020-0067567 A | 6/2020 |

OTHER PUBLICATIONS

Communication dated Mar. 24, 2022, issued by the International Searching Authority in counterpart International Application No. PCT/KR2021/018284 (PCT/ISA/237).

Communication dated Feb. 19, 2025 issued by the Korean Intellectual Property Office in Korean Patent Application No. 10-2020-0168631.

Communication issued on Oct. 23, 2025 by the Korean Intellectual Property Office in Korean Patent Application No. 10-2020-0168631.

* cited by examiner (513)

START

⸝1310
WHEN ELECTRONIC DEVICE HAS FIRST
FORM, PERFORM FIRST FUNCTION IN
RESPONSE TO USER'S FIRST INPUT

⸝1320
OBTAIN THAT ELECTRONIC DEVICE
CHANGES FROM FIRST FORM TO
SECOND FORM

⸝1330
WHEN ELECTRONIC DEVICE HAS SECOND
FORM, PERFORM SECOND FUNCTION IN
RESPONSE TO FIRST INPUT

END

ELECTRONIC DEVICE AND OPERATING METHOD FOR PERFORMING COMMUNICATION CONNECTION WITH PERIPHERAL DEVICE

CROSS-REFERENCE TO RELATED APPLICATIONS

This application is a continuation application of International Application No. PCT/KR2021/018284, filed on Dec. 3, 2021, which claims priority to Korean Patent Application No. 10-2020-0168631, filed on Dec. 4, 2020, in the Korean Intellectual Property Office, the disclosures of which are incorporated by reference herein in their entireties.

BACKGROUND

1. Technical Field

Embodiments disclosed in the present document relate to an electronic device for performing communication connection with a peripheral device, and an operating method thereof.

2. Description of the Related Art

In conventional wireless communication systems, use of short-range communication technologies have widened as technologies using low-cost and/or low-power wireless devices and/or wireless links have emerged. The short-range communication technologies may include various networks such as Bluetooth, Bluetooth Low Energy (BLE), Wireless Fidelity (Wi-Fi), Wi-Fi person-to-person (P2P), Wi-Fi direct, infrared data association (IrDA), and the like. A mobile electronic device may establish communication connections with an external device using one or more of these short-range communication technologies in accordance with deployment scenarios, and, as such, may provide users with various user experiences.

In the conventional wireless communication systems, if or when an electronic device (e.g., a portable terminal) begins a wireless communication (e.g., Bluetooth) function for the sake of a wireless communication (e.g., Bluetooth) connection with a peripheral device (e.g., a Bluetooth device), the electronic device may attempt to scan to connect with the most recently connected peripheral device. However, because the kinds and/or types of peripheral devices have diversified as well, there exists a need for further improvements in establishing wireless communication connections. A way of performing a wireless communication connection based on a use state of the electronic device may be desired. For example, a user-requested function when the electronic device is in a form in which a small screen is used may be different from a user-requested function when the electronic device is in a form in which a large screen is used. Accordingly, there may be a need for a wireless communication connection with a peripheral device suitable to each form. However, when changing a form of the electronic device, the user may have to directly connect a peripheral device suitable to the changed form.

SUMMARY

Various embodiments of the present disclosure may provide methods and electronic devices for performing wireless communication with a peripheral device suitable to each form based on a form change of an electronic device.

A technological solution to be achieved in the present disclosure is not limited to the technological solutions mentioned above, and other technological solutions not mentioned will be able to be clearly understood by those having an ordinary skill in the art to which the present disclosure belongs from a description below.

An electronic device of an example embodiment disclosed in the present document may include a first housing, a second housing, at least one sensor, at least one wireless communication circuit, a flexible display, and at least one processor, and have a first form and a second form based on a specific relative position relationship. When the electronic device has the first form, the at least one processor may establish a wireless communication connection with a first peripheral device mapped to the first form using the at least one wireless communication circuit, and detect that the electronic device changes from the first form to the second form using the at least one sensor, and in response to detecting that the electronic device changing from the first form to the second form, establish a wireless communication connection with a second peripheral device mapped to the second form using the at least one wireless communication circuit.

A method for operating an electronic device of another example embodiment disclosed in the present document may include, when the electronic device has a first form, establishing a wireless communication connection with a first peripheral device mapped to the first form using at least one wireless communication circuit of the electronic device, and detecting that the electronic device changes from the first form to a second form using at least one sensor of the electronic device, and in response detecting that the electronic device changing from the first form to the second form, establishing a wireless communication connection with a second peripheral device mapped to the second form using the at least one wireless communication circuit.

An electronic device of another example embodiment disclosed in the present disclosure may include at least one wireless communication circuit, at least one sensor, a flexible display, and at least one processor. When a first area of the flexible display is activated, using the at least one wireless communication circuit the at least one processor may establish a wireless communication connection with a first peripheral device, and when a second area of the flexible display is activated, using the at least one wireless communication circuit establish a wireless communication connection with a second peripheral device, the second area being greater than the first area.

Various embodiments disclosed in the present document may perform a communication connection with a peripheral device suitable to a form of an electronic device.

Also, various embodiments may automatically perform a communication connection with a peripheral device based on a form change of an electronic device, thereby providing a user with an improved usability and convenience.

In addition, various effects directly or indirectly understood through the present document may be provided.

DETAILED DESCRIPTION

Various embodiments of the present document are described below with reference to the accompanying drawings. However, the present document is not intended to be limited to specific embodiments, and should be understood as including various modifications, equivalents, and/or alternatives of embodiments of the present disclosure.

Figure 1:
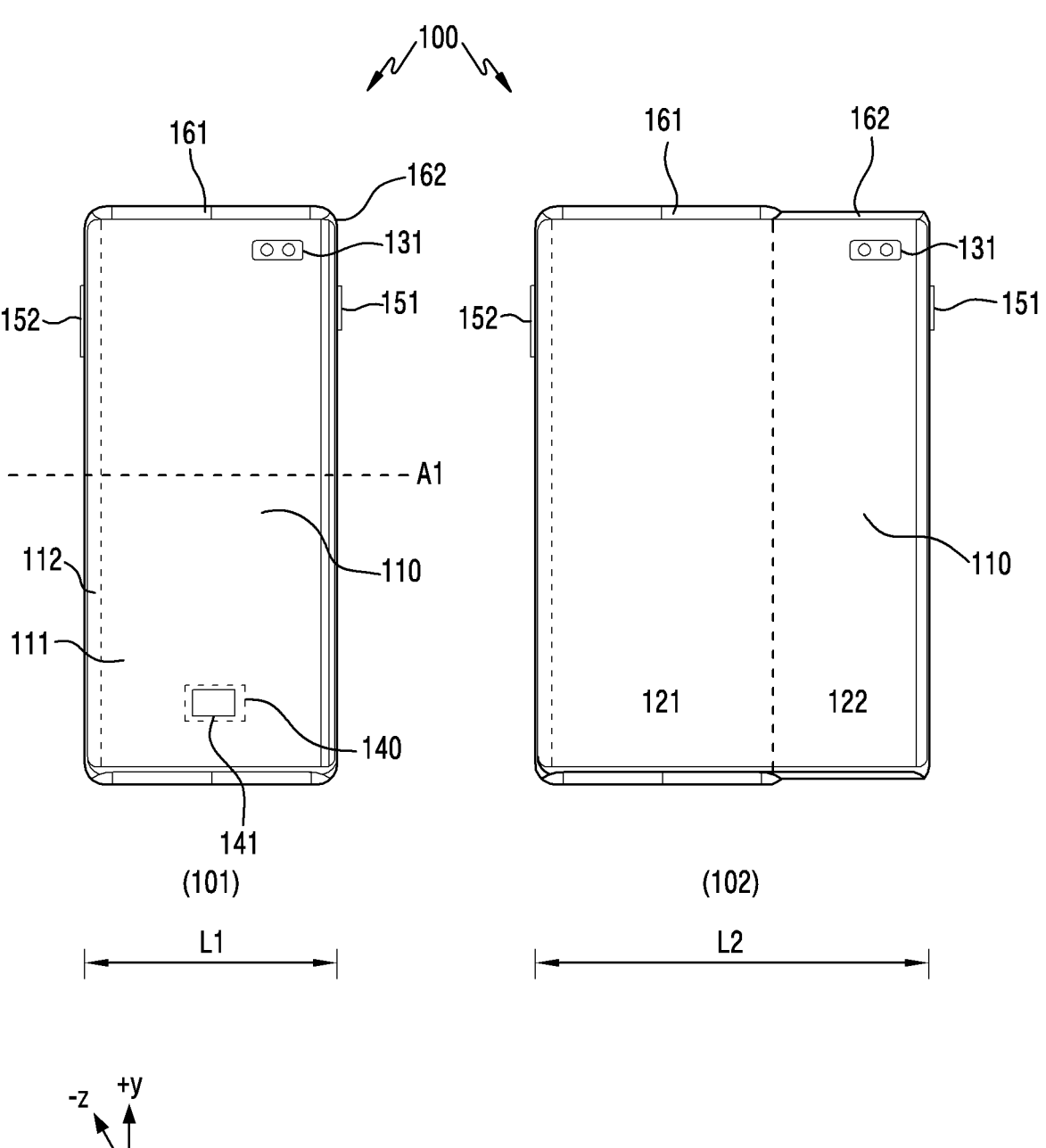
FIG. 1 illustrates an electronic device, according to an embodiment.

FIG. 1 illustrates an electronic device 100 according to various embodiments of the disclosure.

Referring to FIG. 1, a form of the electronic device 100 may be deformed (e.g., modified or changed). For example, the electronic device 100 may be changed from a first form 101 to a second form 102 or be changed from the second form 102 to the first form 101, based on a relative position change of a first housing 161 and a second housing 162. The form change may occur by an external force (e.g., a user applying a force or occur by a motor included in the electronic device 100. For example, the external force may be a force applied by a user by which the user pulls and/or pushes at least one housing, or be a force applied by the user by which the user folds and/or unfolds the electronic device 100. The second housing 162 may be referred to as a sliding housing.

In an embodiment, the first form 101 may be a form in which a flexible display 110 is exposed as much as a first area with a criterion of a front surface of the electronic device 100, and the second form 102 may be a form in which the flexible display 110 is exposed as much as a second area with a criterion of the front surface of the electronic device 100. The second area may be a larger region than the first area. In an embodiment, the first form 101 may be a form in which a width of the flexible display 110 is a first length L1, and the second form 102 may be a form in which the width of the flexible display 110 is extended and has a second length L2 that may be longer than the first length L1.

Referring to FIG. 1, the electronic device 100 may be physically configured in the first form 101 or in the second form 102. Alternatively or additionally, the form of the electronic device 100 disclosed in the present document may also be described as a state of the electronic device 100. For example, the first form 101 may correspond to a first state of the electronic device 100, and the second form 102 may correspond to a second state of the electronic device 100.

The forms of the electronic device 100 illustrated in FIG. 1 correspond to an example, and does not limit the scope of the present disclosure. That is, the electronic device 100 employs the flexible display 110 and a hinge structure, but the scope disclosed in the present disclosure may be applied to other foldable electronic devices, such as a tablet, or a notebook computer that is foldable in a horizontal direction or is foldable in a vertical direction, for example. Alternatively or additionally, the scope of the present document may be applied to a multi-folding structure in which the electronic device 100 has the flexible display 110 and a plurality of hinges, a vertically slidable structure of the electronic device 100, a stretchable display structure, and the like. Accordingly, the first form described in the present disclosure may be applied to a folded form of a foldable electronic device, and/or the second form described in the present disclosure may be applied to an unfolded form of the foldable electronic device.

Referring to FIG. 1, the flexible display 110 may be disposed on the front surface of the electronic device 100 of an embodiment. In an embodiment, the flexible display 110 may occupy a majority of the front surface of the electronic device 100. The front surface may be a surface of the electronic device 100 facing a +z direction. The flexible display 110 and a black margin region surrounding at least some edges of the flexible display 110 may be disposed on the front surface of the electronic device 100. The black margin region may be referred to as a black matrix region and/or a bezel region. In an example of FIG. 1, the flexible display 110 may include a flat area 111, and a curved area 112 extending from the flat area 111 towards a side surface (e.g., a surface of −x direction or +x direction) of the electronic device 100. In FIG. 1, the curved area 112 is illustrated only at one side (e.g., a left side), but it may be understood that a curved area may also be formed at an opposite side of the electronic device 100.

In an embodiment, a fingerprint sensor 141 for recognizing a user's fingerprint may be included in a first area 140 of the flexible display 110. Since the fingerprint sensor 141 may be disposed under the display 110, the fingerprint sensor 141 may not by recognized by a user, and/or a user may find the fingerprint sensor 141 to be difficult to be recognized. Also, in addition to the fingerprint sensor 141, a sensor (not shown) for additional user/biometric authentication may be disposed in a partial region of the flexible display 110. In another embodiment, a sensor (not shown) for user/biometric authentication may be disposed in a region of a bezel. For example, an IR sensor for iris authentication may be exposed through a region of the flexible display 110, or be exposed through a region of the bezel.

In an embodiment, the electronic device 100 may include one or more front cameras 131. For example, the electronic device 100 may include two front cameras such as a first front camera and a second front camera. In an embodiment, the first front camera and the second front camera may be cameras of a same kind having a same specification (e.g., pixel resolution, aperture, and the like), but the first front camera and the second front camera may be implemented as cameras with different specifications. The electronic device 100 may support a function related to a dual camera (e.g., 3D imaging, auto focus, and the like) using the two front cameras (i.e., first front camera, second front camera). In an embodiment, the front camera 131 may not be visually exposed, and may include a hidden under display camera (UDC).

In an embodiment, the electronic device 100 may include one or more rear cameras (not shown). Various hardware or sensors for assisting photographing such as a flash, may be alternatively or additionally disposed in the rear camera. For example, a distance sensor (e.g., a time-of-flight (TOF) sensor) for detecting a distance between a subject and the electronic device 100 may be further included. A rear surface may be a surface of the electronic device 100 when viewed in a −z direction. The rear camera may provide a similar functionality and/or be placed in similar locations as to those described above in reference to the front camera 131.

In an embodiment, at least one physical key may be disposed in a side part of the electronic device 100. For example, a first function key 151 for turning on/off the flexible display 110 or turning on/off the electronic device 100 may be disposed at a right edge with respect to the front surface of the electronic device 100. In an embodiment, a second function key 152 for controlling a volume of the electronic device 100 or controlling a screen brightness, and the like, may be disposed at a left edge with respect of the front surface of the electronic device 100. Alternatively or additionally, other buttons and/or keys (not shown) may be disposed on the front surface and/or the rear surface of the electronic device 100. For example, a physical button or touch button mapped to a specific function may be disposed in a lower region of a front bezel.

Various embodiments will be described below with reference to the electronic device 100 illustrated in FIG. 1. For the sake of brevity, the embodiments described below that refer to the electronic device 100 may not repeat descriptions of the functionality and/or features described above in reference to FIG. 1.

Figure 2:
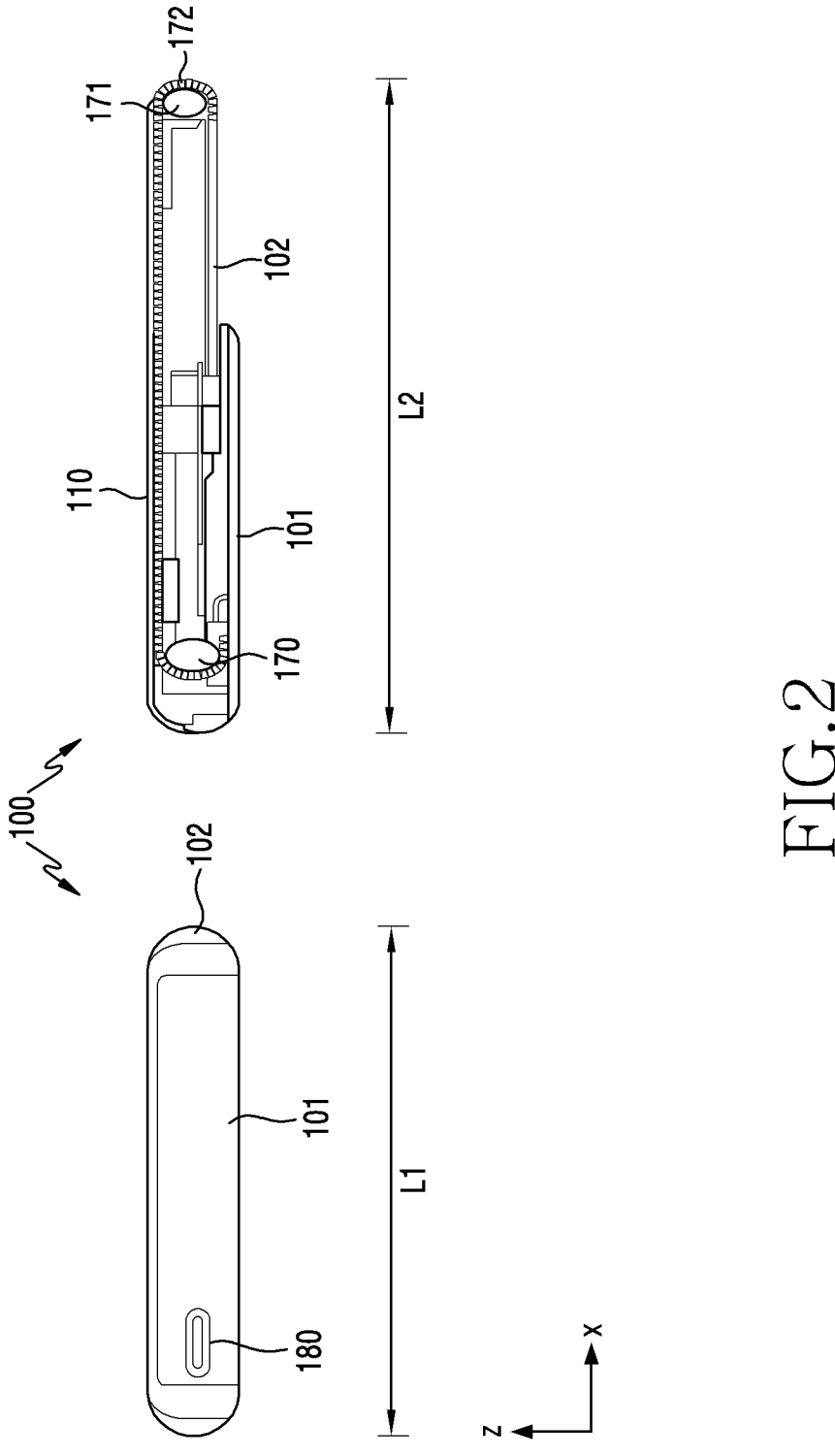
FIG. 2 illustrates a side view and a cross-sectional view of an electronic device, according to an embodiment.

FIG. 2 illustrates a side view and a cross-sectional view of the electronic device 100 of an embodiment. The cross-sectional view illustrated in FIG. 2 is a cross-sectional view that is drawn with respect to a dotted line (A1) of FIG. 1.

Referring to FIG. 2, the electronic device 100 may have the first form 101, in which the flexible display 110 has the first length L1, and may have the second form 102, in which the flexible display 110 is extended to the second length L2.

In an embodiment, at least a part of the second housing 162 may be inserted into and/or accommodated inside the first housing 161, if or when the electronic device 100 has the first form 101. At least a part of the second housing 162 may protrude from the first housing 161, if or when the electronic device 100 has the second form 102. In an embodiment, the second housing 162 may cover a portion (e.g., a rear surface and/or a side surface) of the flexible display 110. Alternatively or additionally, the second housing 162 may protect the flexible display 110 from an external impact and/or a scratch.

In an embodiment, the electronic device 100 may include a rolling actuator 170. The rolling actuator 170 may be disposed adjacent to one side surface (e.g., a side surface of a −x direction) of the electronic device 100. The rolling actuator 170 may be connected to at least a partial region of the first housing 161. The rolling actuator 170 may be implemented in a manner similar to a rod-type gear motor. The rolling actuator 170 may include a rotation gear which may form a rotation axis. Alternatively or additionally, the rotation gear may include a plurality of protrusions.

In an embodiment, the second housing 162 may include a multi-plate 172 in at least one portion. The multi-plate 172 may include a plurality of plates. The multi-plate 172 may be referred to as a sliding rail. The plurality of plates may be disposed at a lower end of the flexible display 110 at regular intervals. The sliding rail 172 may be fixed to a roller 171. That is, the multi-plate 172 may be engaged with a rotation gear of the rolling actuator 170 and may convert a rotation motion of the rotation gear into a linear motion of the second housing 162. The second housing 162 may protrude from the inside of the first housing 161 in an outward direction (e.g., a +x direction) through a linear motion of a first direction (e.g., the +x direction).

In an embodiment, in response to a rotation motion of the rolling actuator 170, the multi-plate 172 engaged with the rotation gear of the rolling actuator 170 may be rolled-up and/or rolled-down. For example, the rolling actuator 170 may be rotated in a first rotation direction (e.g., a clockwise direction), and the multi-plate 172 may be unfolded while being rolled-up in the first rotation direction. For another example, the rolling actuator 170 may be rotated in a second rotation direction (e.g., a counterclockwise direction), and the multi-plate 172 may be wound while being rolled-down in the second rotation direction.

In an embodiment, the electronic device 100 may include a first terminal 180. The first terminal 180 may be a charging port for charging the electronic device 100. The first terminal 180 may include various types of charging ports. For example, the first terminal 180 may be a Universal Serial Bus (USB)-C type charging port. In another example, the first terminal 180 may be a 5-pin type charging port.

Figure 3:
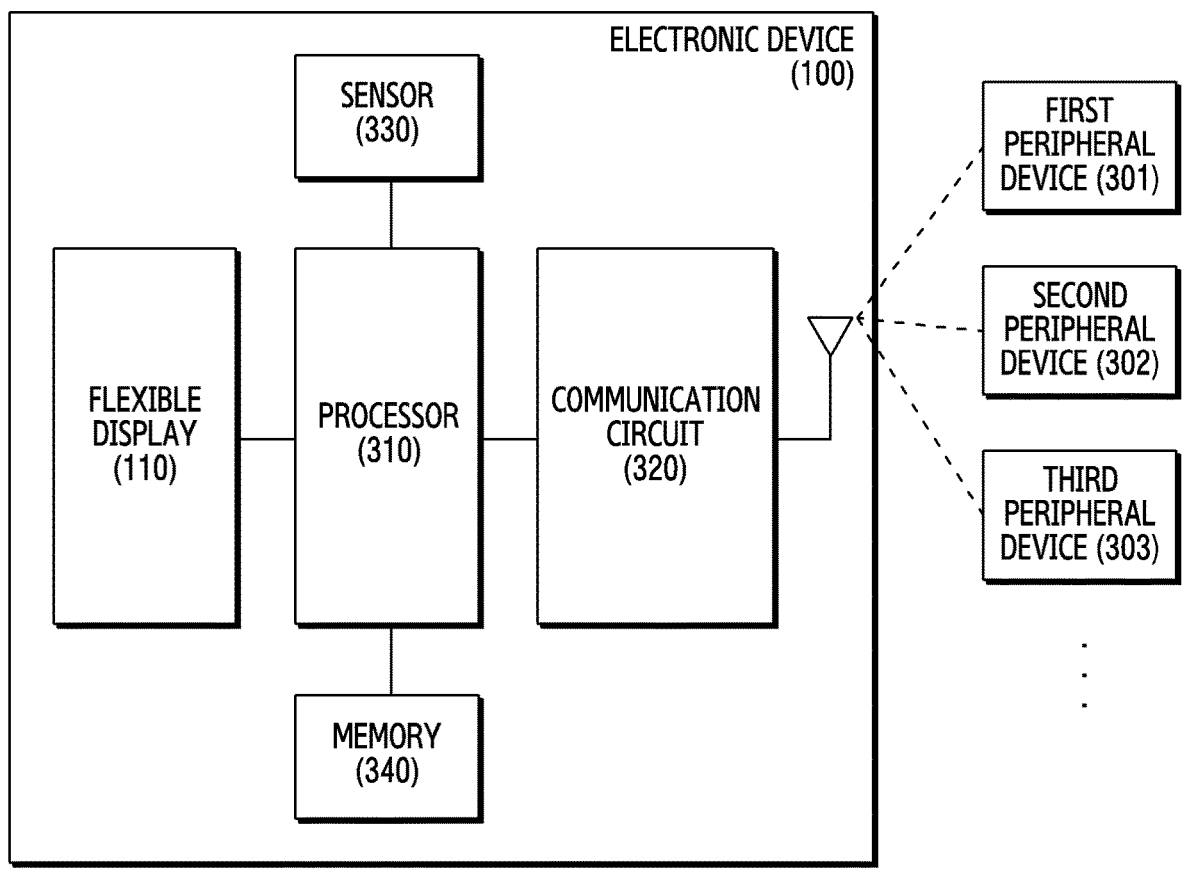
FIG. 3 illustrates hardware components of an electronic device and a peripheral device, according to an embodiment.

FIG. 3 illustrates hardware components of the electronic device 100 and a peripheral device according to an embodiment.

Referring to FIG. 3, the electronic device 100 may include a flexible display 110, a processor 310, a communication circuit 320, at least one sensor 330, and/or at least one memory 340. The processor 310 may be operatively and/or electrically connected to the flexible display 110, the communication circuit 320, the at least one sensor 330, and the at least one memory 340.

In an embodiment, the communication circuit 320 may include a wired communication circuit and/or a wireless communication circuit. The processor 310 may perform wireless communication (e.g., Bluetooth) with a peripheral device (e.g., a Bluetooth device), another external electronic device (e.g., a notebook computer), and/or a server through the communication circuit 320. If or when a wireless communication (e.g., Bluetooth) connection with the peripheral device is established, the processor 310 may receive data from the peripheral device using the communication circuit 320. If or when the wireless communication connection with the peripheral device is established, the processor 310 may transmit data to the peripheral device using the communication circuit 320.

In an embodiment, the at least one sensor 330 may include a sensor for measuring an extended length of the flexible display 110. A process for determining the extended length through the at least one sensor 330 for measuring the extended length may be performed together with a process for determining the extended length of the flexible display 110 through the number of rotations of the rolling actuator 170.

In an embodiment, the processor 310 may determine that the electronic device 100 changes from the first form 101 to the second form 102 changes from the second form 102 to the first form 101, based on the extended length of the flexible display 110 as measured using the at least one sensor 330. For example, the processor 310 may detect that the flexible display 110 is extended from a first length to a second length and/or that the flexible display 110 is reduced from the second length to the first length, based on the extended length measured using the at least one sensor 330. The second length may be longer than the first length.

In an embodiment, the at least one sensor 330 may include a Hall (or Hall effect) sensor. The at least one sensor 330 (e.g., the Hall sensor) may detect a displacement of at least one housing (e.g., the first housing 161 and/or the second housing 162) through a position of a magnet that moves together with the at least one housing. The at least one sensor (e.g., the Hall sensor) 330 may measure a position of an opposing magnet with respect to the at least one sensor (e.g., the Hall sensor) 330, through an interaction with the opposing magnet. By measuring the change of a magnetic field formed by the opposing magnet, the at least one sensor (e.g., the Hall sensor) 330 may detect a position of the opposing magnet. Alternatively or additionally, the at least one sensor 330 may determine a distance between the at least one sensor 330 and the opposing magnet.

In an embodiment, the processor 310 may determine whether the electronic device 100 has been changed from the first form 101 to the second form 102, and/or has been changed from the second form 102 to the first form 101, based on the detected displacement of the housing. For example, the processor 310 may detect that the second housing 162 protrudes from the first housing 161 as much as a second length at a first length, or is inserted as much as the first length at the second length, based on the detected displacement of the housing. The second length may be longer than the first length. As another example, the processor 310 may detect that an angle between the first housing 161 and the second housing 162 changes from a first angle to a second angle based on the detected displacement of the housing, as measured by the at least one sensor 330. Alternatively or additionally, the processor 310 may detect that the angle between the first housing 161 and the second housing 162 changes from the second angle to the first angle, based on the detected displacement of the housing as measured by the at least one sensor 330.

In an embodiment, the memory 340 may store information on at least one peripheral device and profile information on the at least one peripheral device. For example, the memory 340 may store information on a previously connected device and profile information on a previously connected first peripheral device 301.

In an embodiment, the first peripheral device 301 may have at least one or more profiles. For example, the first peripheral device 301 may be a peripheral device having a first profile and/or a second profile. That is, the first peripheral device 301 may be a peripheral device (e.g., a wireless earphone) having a first profile (e.g., a headset profile (HSP)) and/or a second profile (e.g., an advanced audio distribution profile (A2DP) and/or an audio/video remote control profile (AVRCP). For example, the first profile is a headset profile (HSP) and may be a profile supporting a phone call. For example, the second profile may include an advanced audio distribution profile (A2DP) and/or an audio/video remote control profile (AVRCP). The A2DP may be a profile supporting a high-quality voice signal, and the AVRCP may be a profile that supports music playback, music stop, song skip, media streaming, and/or media control.

In an embodiment, a second peripheral device 302 may have at least one profile. For example, the second peripheral device 302 may be a peripheral device (e.g., a wireless keyboard and/or a wireless mouse) having a third profile (e.g., a human interface device (HID)) for supporting user input. In other words, the third profile (e.g., HID) may be a profile that supports a plurality of peripheral devices.

In an embodiment, a third peripheral device 303 may be a peripheral device having at least one or more profiles. For example, the third peripheral device 303 may have a first profile (e.g., HSP) and/or a second profile (e.g., A2DP and/or AVRCP). In other words, since the third peripheral device 303 may have a second profile (e.g., A2DP and/or AVRCP) that is similar to the second profile of the first peripheral device 301 (e.g., a wireless earphone), as such, the third peripheral device 303 may be a device (e.g., a wireless speaker) with a function such as music playback, music stop, song skip, and the like.

Referring to FIG. 3, the peripheral devices (e.g., the first peripheral device 301 to the third peripheral device 303) and their respective profiles are merely one example within the scope of the present disclosure. In other words, the peripheral device capable of establishing a wireless communication (e.g., Bluetooth) connection with the electronic device 100 may include various peripheral devices in addition to the first peripheral device 301 to the third peripheral device 303. For example, the peripheral devices 301-303 may include various peripheral devices such as a wireless communication (e.g., Bluetooth) connectable tripod, a tripod control key, a vehicle, a printer, a home appliance, and the like. In some embodiments, various peripheral devices such as the tripod, the tripod control key, the vehicle, the printer, and the home appliances may perform short-range wireless communication with the electronic device 100, in the first form 101, the second form 102, and/or a third form of the electronic device 100. The third form may include a other than the first form 101 and the second form 102.

The peripheral devices (e.g., the first peripheral device 301 and the second peripheral device 302) performing the short-range wireless communication with the electronic device 100 have been described in FIG. 3, this is only one example. According to another embodiments, the scope of the present disclosure may be applied to an external device performing various wireless communications in addition to a short-range wireless communication with the electronic device 100. For example, the scope of the present disclosure may be applied to an external device performing an ultra-wide band (UWB) communication with the electronic device 100.

Figure 4:
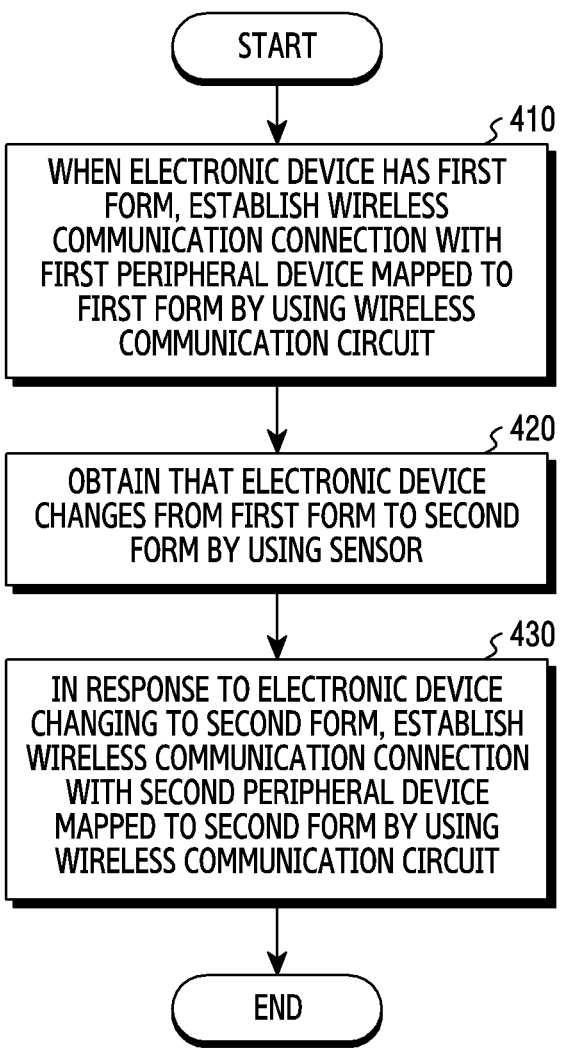
FIG. 4 illustrates a process for establishing a wireless communication connection with a peripheral device corresponding to the changed form, according to an embodiment.

FIG. 4 illustrates a process for establishing a wireless communication connection with a peripheral device corresponding to the changed form, according to an embodiment.

In operation 410 according to an embodiment, if or when the electronic device 100 has the first form 101, the processor 310 may establish a wireless communication (e.g., Bluetooth) connection with a first peripheral device 301 mapped to the first form 101 using the communication circuit 320. In an embodiment, the first peripheral device 301 mapped to the first form 101 may refer to an external device corresponding to the first form 101 of the electronic device 100.

In an embodiment, by performing a device discovery procedure, the processor 310 or the first peripheral device 301 may identify a counterpart device existing within a communicable range. For example, the first peripheral device 301 may perform an inquiry scan, and the processor 310 may transmit an ID packet to the first peripheral device 301. The first peripheral device 301 may transmit a response to the ID packet, and, accordingly, the processor 310 may recognize the first peripheral device 301.

In an embodiment, the processor 310 may recognize the first peripheral device 301 using wireless communication (e.g., Bluetooth communication). The first peripheral device 301 may transmit an advertising signal to the surroundings in a multicasting scheme and/or a broadcasting scheme. The advertising signal may be a signal for transmitting information related to connection or account (e.g., pairing) to an unspecified peripheral electronic device (e.g., the electronic device 100) using the wireless communication (e.g., Bluetooth communication). For example, the advertising signal may include at least one of identification information on the first peripheral device 301 (hereinafter, device identification information), account information of the user (hereinafter, user account information), information on whether the first peripheral device 301 is currently paired with another device (hereinafter, pairing information), a list of previously paired devices (hereinafter, a pairing list), information on devices that are possible to be paired simultaneously (hereinafter, simultaneous pairing information), transmit (Tx) power, an obtaining area and/or information on a battery level (hereinafter, battery state information), and the like. In an embodiment, if or when the electronic device 100 has the first form 101, the processor 310 may perform a wireless communication connection with the first peripheral device 301 that is set to be connected to the first form 101. For example, the first peripheral device 301 may be a wireless earphone that is set to be automatically connected to the first form 101. The term "automatically" may be understood to an operation that may occur without input from a user (e.g., a human).

In an embodiment, if or when the electronic device 100 has the first form 101, the processor 310 may establish a wireless communication connection with the first peripheral device 301 previously connected to the first form 101. The processor 310 may identify information on a previously connected peripheral device and profile information on the previously connected peripheral device. The processor 310 may scan the previously connected first peripheral device 301, based on the identified information.

In an embodiment, if or when the electronic device 100 has the first form 101, the processor 310 may establish a wireless communication connection with the first peripheral device 301, in response to obtaining a user input for establishing a connection with the first peripheral device 301. For example, the processor 310 may detect an input from a user for establishing a Bluetooth connection with the first peripheral device. In response to the input from the user, the processor 310 may scan the first peripheral device 301. The processor 310 may transmit a connection request signal to the scanned first peripheral device 301.

In operation 420 according to an embodiment, the processor 310 may detect that the electronic device 100 changes from the first form 101 to the second form 102 using the at least one sensor 330.

In an embodiment, the processor 310 may identify an extended length through the at least sensor 330 measuring the extended length of the flexible display 110. The processor 310 may detect that the electronic device 100 changes from the first form 101 to the second form 102, based on the identified extended length. For example, the processor 310 may detect that the flexible display 110 is extended from a first length to a second length and/or is reduced from the second length to the first length, based on the measured extended length. The first length may be a length of the flexible display 110 corresponding to the first form 101, and the second length may be a length of the flexible display 110 corresponding to the second form 102. The second length may be longer than the first length. In an embodiment, the first length and the second length may mean lengths of regions viewed from the outside of the electronic device 100 among the flexible display 110. Accordingly, the first length of the viewed region of the flexible display 110 corresponding to the first form 101 may be shorter than the second length of the viewed region of the flexible display 110 corresponding to the second form 102.

In an embodiment, the processor 310 may detect a displacement of at least one housing (e.g., the first housing 161 and/or the second housing 162) through a position of a magnet which moves together with the at least one housing, through the at least one sensor 330 (e.g., a Hall sensor). The processor 310 may detect that the electronic device 100 changes from a first form (e.g., a folded form of a foldable electronic device) to a second form (e.g., an unfolded form of the foldable electronic device), based on the detected displacement of the housing. As another example, the processor 310 may detect that the angle between the first housing 161 and the second housing 162 changes from the first angle to the second angle based on the detected displacement of the housing. As another example, the processor 310 may detect that the angle between the first housing 161 and the second housing 162 changes from the second angle to the first angle based on the detected displacement of the housing. The first angle may be an angle corresponding to the first form 101, and the second angle may be an angle corresponding to the second form 102. The first angle may be an angle greater than the second angle.

In operation 430 according to an embodiment, in response to the electronic device 100 being changed to the second form 102, the processor 310 may establish a wireless communication connection with the second peripheral device 302 mapped to the second form 102 using the wireless communication circuit 320.

In an embodiment, the processor 310 may identify that the electronic device 100 changes from the first form 101 to the second form 102. In response to the electronic device 100 being changed to the second form 102, the processor 310 may scan a peripheral device that is set to be connected to the second form 102. The peripheral device that is set to be connected to the second form 102 may be a previously connected device, or a device having a previously stored profile as well.

In an embodiment, the processor 310 may specify a peripheral device having a specific profile (e.g., HID, A2DP, or HSP) to be connected to the second form 102. For example, in response to the electronic device 100 being changed to the second form 102, the processor 310 may scan the peripheral device having a specific profile (e.g., HID, A2DP, or HSP).

In an embodiment, the processor 310 may identify a peripheral device intended to be connected, which exists within a usable or connectable range, using at least one distance positioning technology. The processor 310 may identify whether a peripheral device mapped to be connected to the second form 102 exists within a connectable range, based on a received signal strength indication (RSSI) strength and/or an ultra-wide band (UWB) wireless technology. For example, the electronic device 100 and/or the peripheral device may support an UWB function, and the processor 310 may measure a distance and direction of the peripheral device intended to be connected, through the UWB function.

In an embodiment, the processor 310 may identify the existence of a peripheral device through the scan operation, and obtain a distance and direction of the identified peripheral device through UWB communication and filter the identified peripheral device. That is, the processor 310 may establish a wireless communication connection with an available peripheral device (e.g., a device within a specific distance and/or a specific direction from the electronic device 100) among the peripheral devices of which existence have been identified, based on the identified distance and direction. For example, if or when the electronic device 100 is changed to the second form 102 and is connected to a Bluetooth keyboard, the processor 310 may identify the Bluetooth keyboard that is located in a direction in which the flexible display 110 faces, and is located within a first distance of a connectable range, and establish a wireless communication connection to the identified Bluetooth keyboard.

In an embodiment, the processor 310 may automatically establish a wireless communication connection with the second peripheral device 302, if or when the existence of the peripheral device is identified through the scan operation. That is, in response to the electronic device 100 being changed to the second form, the processor 310 may scan the second peripheral device 302 without input from a user (e.g., a human). The processor 310 may establish a wireless communication connection with the second peripheral device 302 through the scan. For example, the second peripheral device 302 may be a wireless mouse that is set to be automatically connected to the second form 102 of the electronic device 100.

In an embodiment, in establishing a wireless communication connection with the second peripheral device 302 mapped to the second form 102, the processor 310 may identify another peripheral device having a same profile as the second peripheral device 302 and establish a wireless communication connection with the another peripheral device. That is, if or when the processor 310 fails to identify the existence of the second peripheral device 302 through the scan operation, the processor 310 may attempt a wireless communication connection to another peripheral device which has the same profile as the second peripheral device 302 and presents the same function. For example, if or when a first wireless mouse having an HID profile which is set to be automatically connected in response to the electronic device 100 being changed to the second form 102 does not exist, the processor 310 may establish a wireless communication connection with a second wireless mouse having the same HID profile. In an embodiment, the second peripheral device 302 mapped to the second form 102 may be understood as an external device substantially corresponding to the second form 102 of the electronic device 100.

Figure 5A:
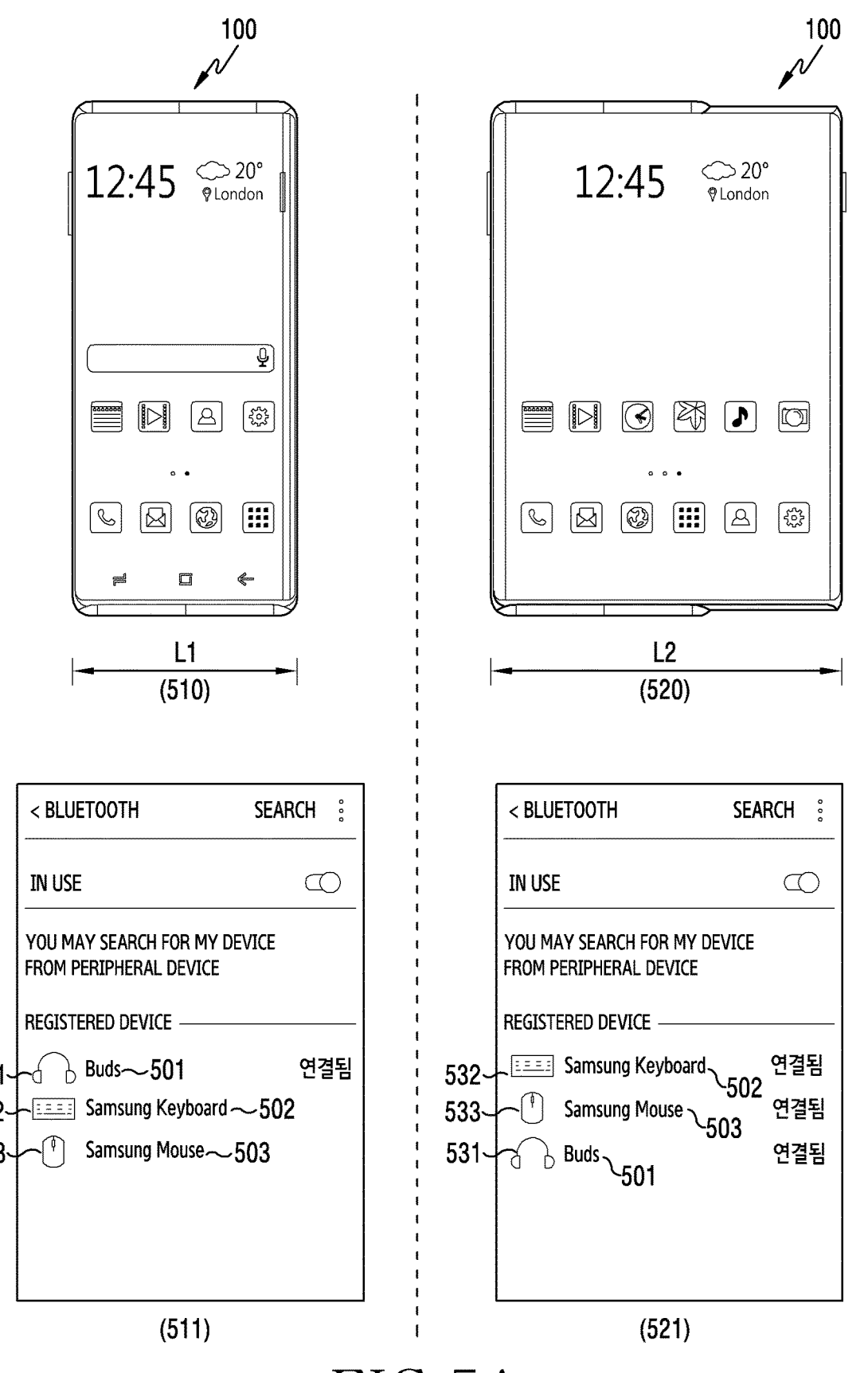
FIG. 5A illustrates a user interface related to a wireless communication connection dependent on a form change of an electronic device, according to an embodiment.

FIG. 5A illustrates user interfaces 511 and 521 related to wireless communication connection dependent on a form change of the electronic device 100, according to an embodiment. In the present document, that the processor 310 may perform a specific operation may be understood as that the electronic device 100 performs the specific operation.

In an embodiment, the processor 310 may detect a plurality of peripheral devices. The processor 310 may display a user interface capable of allowing a user to select at least one peripheral device of the detected plurality of peripheral devices. The processor 310 may form a communication connection with the peripheral device which may have been selected by a user through the user interface. Alternatively or additionally, in response to a form change of the electronic device 100, the processor 310 may form a communication connection with a peripheral device that is associated with, and/or stored to be connected to, a changed form. The processor 310 may perform one or more procedures to form a communication connection with a first peripheral device 501. For example, the processor 310 may perform procedures defined in the Bluetooth standard such as link forming, channel forming, service discovery session forming, and/or channel release. In such an example, by performing the defined procedures, the processor 310 may establish a communication connection with the first peripheral device 501.

In an embodiment, the processor 310 may display information on peripheral devices determined to be located nearby, among information on the peripheral devices stored in the memory 340 and/or received from a server. Alternatively or additionally, the processor 310 may display at least one of communicable peripheral devices. Alternatively or additionally, the processor 310 may determine whether or not to display a specific peripheral device in consideration of a capability of the particular peripheral device.

In an embodiment, the processor 310 may present information on at least one peripheral device through the flexible display 110. For example, referring to FIG. 5A, the processor 310 may display a screen of a first user interface 511 and/or a second user interface 521 on a display (e.g., the flexible display 110) of the electronic device 100. The processor 310 may display information on at least one of a peripheral device connected through an account or a peripheral device connected through short-range communication, based on the information of the peripheral device stored in the memory 340 and/or the information of the peripheral device received from the server. Alternatively or additionally, if or when the processor 310 directly communicates with a peripheral device without going through the server, the processor 310 may display at least part of information on the peripheral device, based on information directly received from the peripheral device. For example, if or when the electronic device 100 has a second form 520, the processor 310 may display a first icon 531 corresponding to a first peripheral device 501, a second icon 532 corresponding to a second peripheral device 502, and a third icon 533 corresponding to a third peripheral device 503. In an embodiment, the processor 310 may display a name of the corresponding peripheral device along with displaying the icon.

In an embodiment, referring to FIG. 5A, if or when the electronic device 100 has a first form 510, the processor 310 may establish a wireless communication connection with the first peripheral device 501 having a plurality of profiles (e.g., a first profile (e.g., HSP) and/or a second profile (e.g., A2DP)). If or when the electronic device 100 has the second form 520, the processor 310 may establish a wireless communication connection with the first peripheral device 501 and/or the second peripheral device 502 and third peripheral device 503 having a third profile (e.g., HID).

In an embodiment, referring to FIG. 5A, the processor 310 may display the interface (e.g., the first user interface 511 or the second user interface 521) related to a wireless communication (e.g., Bluetooth) connection of the electronic device 100, on a display (e.g., the flexible display 110). For example, if or when the electronic device 100 has the first form 510, the processor 310 may display a text (e.g., "connected") indicating that the first peripheral device 501, having the first profile, and the electronic device 100 have established a wireless communication connection (e.g., via a Bluetooth connection). For example, if or when the electronic device 100 has the second form 520, the processor 310 may display a text (e.g., "connected") indicating that the first peripheral device 501, the second peripheral device 502, and the third peripheral device 503 have established corresponding wireless communication connections with the electronic device 100.

Referring to FIG. 5A, the processor 310 may visually display information on a connectable or connected peripheral device, but this is only an example, and the processor 310 may present the information on the connectable or connected peripheral device through various output schemes (e.g., a voice output, haptic feedback, and the like).

Figure 5B:
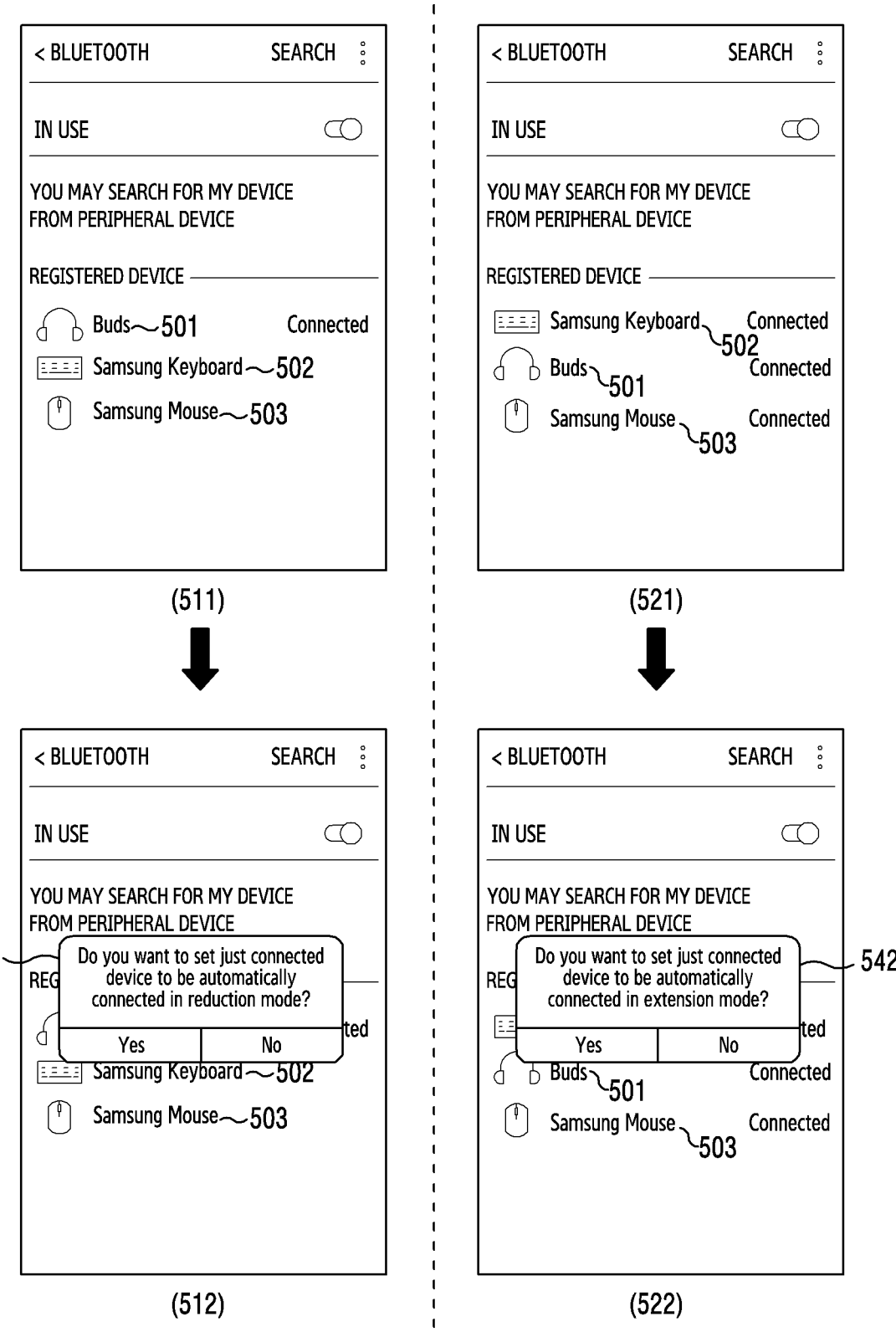
FIG. 5B illustrates a user interface for outputting a message wherein a user may set a connected peripheral device according to a form change of an electronic device, according to an embodiment.

FIG. 5B illustrates user interfaces 512 and 522 for outputting messages 541 and 542 for allowing a user to be able to set a peripheral device that is connected based on a form change of the electronic device 100, according to an embodiment.

In an embodiment, referring to FIG. 5B, the processor 310 may display the third user interface 512 in one region of the flexible display 110. In response to the form of the electronic device 100 changing from the second form 102 to the first form 101, the processor 310 may output the first message 541. By outputting the first message 541, the processor 310 may allow the user of the electronic device 100 to set a peripheral device that will be automatically connected to a specific form (e.g., the first form 101) of the electronic device 100. In an embodiment, the first message 541 may include content such as "Do you want to set a just connected device to be automatically connected in a reduction mode?" or "Do you want to set a currently connected device to be automatically connected in a reduction mode?". The above-mentioned reduction mode may refer to the first form 101.

In an embodiment, if or when the electronic device 100 is changed to a specific form (e.g., the first form 101) through a response from the user (e.g., "Yes") to the first message 541, the processor 310 may set peripheral devices that will be connected automatically. For example, if or when a wireless earphone is connected as the electronic device 100 is changed to the first form 101, the processor 310 may map the wireless earphone to the first form 101 in response to the input from the user for allowing the wireless earphone to be automatically connected to the first form 101 in a setting tab of the electronic device 100.

In an embodiment, referring to FIG. 5B, the processor 310 may display the fourth user interface 522 in a region of the flexible display 110. The processor 310 may output the second message 542 in response to a form change of the electronic device 100 from the first form 101 to the second form 102. By outputting the second message 542, the processor 310 may allow a user of the electronic device 100 to set a peripheral device that will be automatically connected to a specific form (e.g., the second form 102) of the electronic device 100. In an embodiment, the second message 542 may include content such as "Do you want to set a just connected device to be automatically connected in an extension mode?" or "Do you want to set a currently connected device to be automatically connected in an extension mode?". The above-mentioned extension mode may refer to the second form 102.

In an embodiment, if or when the electronic device 100 is changed to a specific form (e.g., the second form 102) through the response from the user (e.g., "Yes") to the second message 542, the processor 310 may set peripheral devices that will be connected automatically. For example, if or when a wireless keyboard is connected as the electronic device 100 is changed to the second form 102, the processor 310 may map the wireless keyboard to the second form (102) in response to the input from the user for allowing the wireless keyboard to be automatically connected to the second form 102 in the setting tab of the electronic device 100.

Figure 5C:
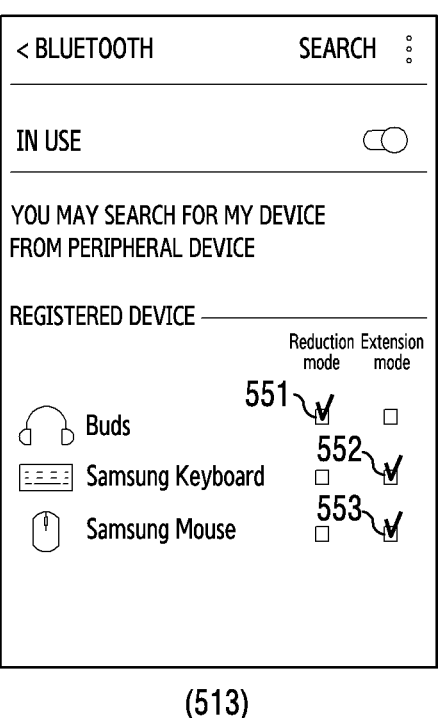
FIG. 5C illustrates a user interface for outputting a checkbox wherein a user may set a connected peripheral device according to a form change of an electronic device, according to an embodiment.

FIG. 5C illustrates a user interface 513 for outputting a checkbox wherein a user may set a connected peripheral device based on a form change of the electronic device 100, according to an embodiment.

Referring to FIG. 5C, the processor 310 may present a checkbox for setting a peripheral device selected by a user to be connected to each of the forms 101 and 102 of the electronic device 100. The processor 310 may present a checkbox for allowing the user to map a peripheral device such as a device scanned and identified to be connectable, a device previously registered to the electronic device 100, and/or a device stored in a user account, to a form (e.g., 101 and/or 102) desired by the user. The processor 310 may acquire user input to a checkbox of a reduction mode and/or a checkbox of an extension mode for each peripheral device. The processor 310 may acquire user inputs for each of the checkboxes of the reduction mode and extension mode for each peripheral device. For example, all the checkbox of the reduction mode and the checkbox of the extension mode may be identified for the first peripheral device 501 (e.g., a wireless earphone).

In an embodiment, the processor 310 may acquire a user input to a checkbox capable of being set to be connected to each of the forms 101 and 102 of the electronic device 100. For example, if or when a checkbox 551 for the first peripheral device 501 is identified by a user, the processor 310 may set wherein the first peripheral device 501 is automatically connected in the reduction mode of the electronic device 100. For example, if or when checkboxes 552 and 553 for the second peripheral device 502 (e.g., a Bluetooth keyboard) and the third peripheral device 503 (e.g., a wireless mouse) are identified by the user, the processor 310 may set the second peripheral device 502 and the third peripheral device 503 to be automatically connected in the extension mode of the electronic device 100.

Figure 6:
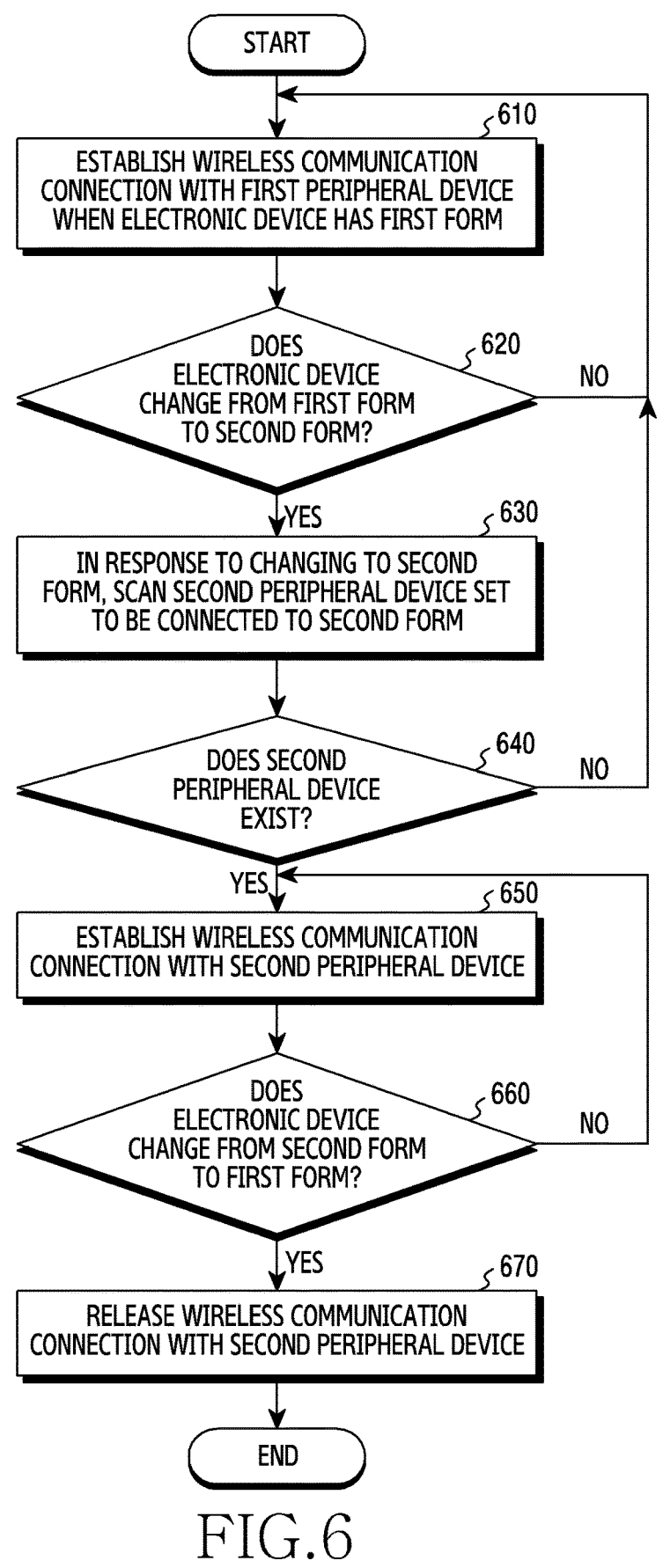
FIG. 6 illustrates a process for establishing or releasing a connection with a peripheral device, based on a form change of an electronic device, according to an embodiment.

FIG. 6 illustrates a process for establishing or releasing a connection with a peripheral device, based on a form change of the electronic device 100, according to an embodiment.

In operation 610 according to an embodiment, if or when the electronic device 100 has the first form 101, processor 310 may establish a wireless communication connection with the first peripheral device 301. For example, operation 610 may correspond to operation 410 of FIG. 4.

In operation 620 according to an embodiment, the processor 310 may determine whether the electronic device 100 changes from the first form 101 to the second form 102. For example, operation 620 may correspond to operation 420 of FIG. 4. If or when the processor 310 does not detect that the electronic device 100 changes from the first form 101 to the second form 102, the processor 310 may maintain a wireless communication connection with the first peripheral device 301 connected to the first form 101. If or when the processor 310 detects that the electronic device 100 changes from the first form 101 to the second form 102, the processor 310 may perform operation 630 so as to establish a wireless communication connection with the second peripheral device 302 that is set to be connected to the second form 102.

In operation 630 of an embodiment, in response to the electronic device 100 being changed to the second form 102, the processor 310 may scan the second peripheral device 302 that is set to be connected to the second form 102. For example, the processor 310 may broadcast communication connection information (e.g., an advertising signal) to the outside of the electronic device 100. By broadcasting a frequency signal having a specified frequency, the processor 310 may scan the second peripheral device 302 that is set to be connected to the second form 102. The second peripheral device 302 scanned by the processor 310, for example, may be a device which has an existing connection history and in which the electronic device 100 stores device information, account information, and profile information on the second peripheral device 302. Alternatively or additionally, the second peripheral device 302 may be a device which does not have a previous connection history and in which the processor 310 needs to acquire information on the second peripheral device 302 directly from the server (e.g., a server 1003 of FIG. 10) and/or the second peripheral device 302.

In an embodiment, in response to the electronic device 100 being changed to the second form 102, the processor 310 may scan a peripheral device that is set to be connected to the second form 102. The peripheral device set to be connected to the second form 102 may be a previously connected device, and/or a device having a previously stored profile. Alternatively or additionally, the processor 310 may specify a peripheral device having a specific profile (e.g., HID, A2DP or HSP) to be connected to the second form 102. For example, in response to the electronic device 100 being changed to the second form 102, the processor 310 may scan the peripheral device having a specific profile (e.g., HID, A2DP, or HSP).

In an embodiment, the processor 310 and/or the second peripheral device 302 may identify a counterpart device within a communicable range by performing a device discovery procedure. For example, the second peripheral device 302 may perform an inquiry scan, and the processor 310 may transmit an ID packet to the second peripheral device 302. The second peripheral device 302 may transmit a response to the ID packet, and accordingly, the processor 310 may recognize the second peripheral device 302.

In an embodiment, the processor 310 may recognize the second peripheral device 302 using wireless communication (e.g., Bluetooth communication). The second peripheral device 302 may transmit an advertising signal to the surroundings in a multicasting scheme or a broadcasting scheme.

In an embodiment, the processor 310 may change an execution path, based on a peripheral device having already been connected and/or having a connection history, and not perform a process for newly connecting the peripheral device. For example, in the second form 102 of the electronic device 100, if or when a call application is executed, the processor 310 may connect an audio path to a speaker, and/or if or when a music application is executed, the processor 310 may change the audio path to a Bluetooth speaker with which a communication connection has been already established.

In operation 640 of an embodiment, the processor 310 may identify whether the second peripheral device 302 exists. For example, in response to the advertising signal received from the second peripheral device 302, the processor 310 may identify whether the second peripheral device 302 exists. If or when the second peripheral device 302 that will be connected exists, the processor 310 may perform operation 650, and otherwise, the processor 310 may perform operation 610.

In operation 650 of an embodiment, the processor 310 may establish a wireless communication connection (e.g., Bluetooth) with the second peripheral device 302. The processor 310 may establish a wireless communication connection with the second peripheral device 302 and transmit and/or receive data with the second peripheral device 302.

In operation 660 of an embodiment, the processor 310 may detect that the electronic device 100 changes from the second form 102 to the first form 101. If or when the electronic device 100 returns from the second form 102 to the first form 101, the processor 310 may perform operation 670 and if or when the electronic device 100 maintains the second form 102, the processor 310 may perform operation 650 and maintain the wireless communication connection with the second peripheral device 302.

In operation 670 according to an embodiment, the processor 310 may release the wireless communication connection with the second peripheral device 302. In response to the electronic device 100 being changed from the second form 102 to the first form 101, the processor 310 may release the wireless communication connection with the second peripheral device 302.

In an embodiment, although the electronic device 100 changes from the second form 102 to the first form 101 and releases the wireless communication connection with the second peripheral device 302 without user input, the processor 310 may establish a wireless communication connection with the second peripheral device 302 in response to additional user input in the first form 101. For example, referring to FIG. 5A, the processor 310 may establish a wireless communication connection with the second peripheral device 502, in response to an input that a user selects the second peripheral device 502 through the first user interface 511 in the first form 510 of the electronic device 100.

Figure 7:
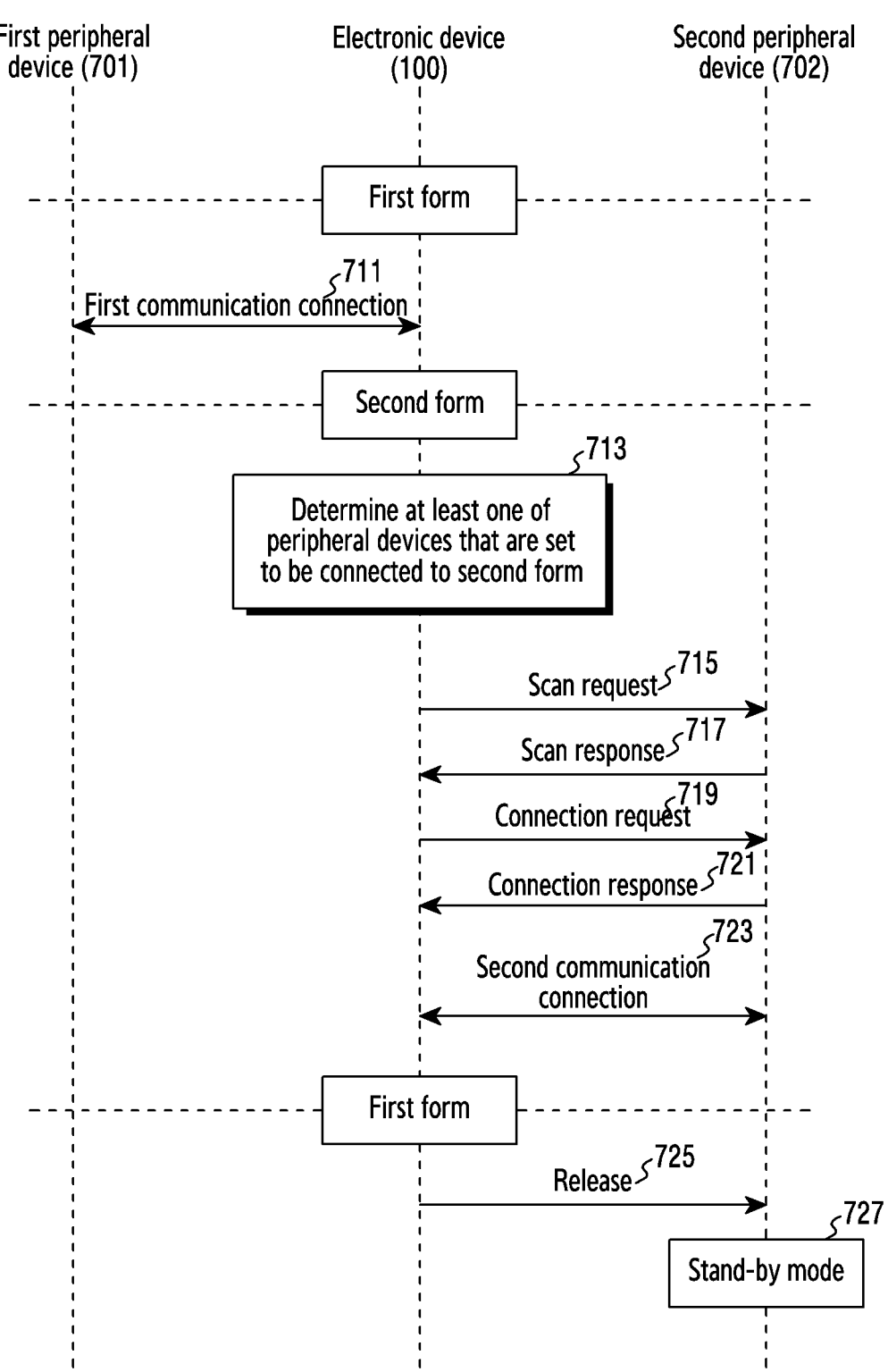
FIG. 7 illustrates a scenario of establishing or releasing a connection with a peripheral device, based on a form change of an electronic device, according to an embodiment.

FIG. 7 illustrates a scenario of establishing or releasing a connection with a peripheral device, based on a form change of the electronic device 100 according to an embodiment. It may be understood that the operation of the electronic device 100 is performed by the processor 310 included in the electronic device 100. The second peripheral device 702 may be a peripheral device that is set to be automatically connected to the second form 102 of the electronic device 100 and/or a peripheral device having a profile that is set to be automatically connected to the second form 102.

In operation 711 according to an embodiment, if or when the electronic device 100 has the first form 101, the electronic device 100 may establish a first communication connection with the first peripheral device 701. For example, operation 711 may correspond to operation 410 of FIG. 4.

In operation 713 according to an embodiment, the electronic device 100 may determine at least one of peripheral devices that are set to be connected to, or are mapped to, the second form 102. That is, in response to being changed to the second form, the electronic device 100 may determine whether there is a need to connect with a specific peripheral device of the peripheral devices mapped to the second form 102. In an embodiment, if or when the electronic device 100 is changed to the second form 102, the electronic device 100 may scan a peripheral device that is set to be connected, based on information on the peripheral device that is set to be connected, or information on a profile of the peripheral device, or status information on the electronic device 100. For example, the processor 310 may set the electronic device 100 to be connected to a Bluetooth keyboard in response to the electronic device 100 being changed to the second form 102. In an embodiment, the electronic device 100 may determine the second peripheral device 702 that may be suitable to a currently executed application, in consideration of the currently executed application. For example, if or when the electronic device 100 is changed to the second form 102 while an application related to movie watching is being executed, the processor 310 may scan a Bluetooth speaker so as to change an audio path from a speaker of the electronic device 100 to the Bluetooth speaker.

In operation 715 according to an embodiment, if or when the electronic device 100 changes from the first form 101 to the second form 102, the electronic device 100 may transmit a scan request signal to the second peripheral device 702. The electronic device 100 may transmit a scan request signal to the second peripheral device 702 that is set to be connected to the second form 102. The second peripheral device 702 may receive the scan request signal. The second peripheral device 702 may determine whether the scan request signal is a valid signal.

In operation 717 according to an embodiment, the second peripheral device 702 may transmit a scan response signal to the electronic device 100 in response to the scan request signal.

In operation 719 according to an embodiment, the electronic device 100 may transmit a connection request signal to the second peripheral device 702 in response to receiving the scan response signal from the second peripheral device 702. In operation 721, after receiving the connection request signal, the second peripheral device 702 may transmit a response signal to the connection request signal, to the electronic device 100.

In operation 723 according to an embodiment, the electronic device 100 may establish a second communication connection with the second peripheral device 702 in response to the connection request signal of the second peripheral device 702. In an embodiment, the electronic device 100 may change from the second form 102 to the first form 101 in a state in which the second communication connection with the second peripheral device 702 has been established.

In operation 725 according to an embodiment, in response to being changed to the first form 101, the electronic device 100 may release the second communication connection with the second peripheral device 702 that is mapped to be connected to the second form 102. To release the second communication connection with the second peripheral device 702, the electronic device 100 may transmit a release signal to the second peripheral device 702. By transmitting the release signal to the second peripheral device 702, the electronic device 100 may release the wireless communication connection with the second peripheral device 702, and may maintain a state in which the first communication connection with the first peripheral device 701 has been established.

In operation 727 according to an embodiment, the second peripheral device 702 may enter a stand-by mode that is a mode in which a wireless communication connection with another external electronic device is possible. For example, the second peripheral device 702 may operate in a page scan mode after the second communication connection is released. After the second communication connection is released, the second peripheral device 702 may be set to automatically operate in the page scan mode, and/or, if or when the second communication connection is released after a communication signal for operating in the page scan mode is received from the electronic device 100, the second peripheral device 702 may operate in the page scan mode. In an embodiment, after entering the page scan mode, the second peripheral device 702 may adjust at least one of a window size of page scan, an interval between windows of the page scan, or an interval of application of a current applied for signal reception.

Figure 8:
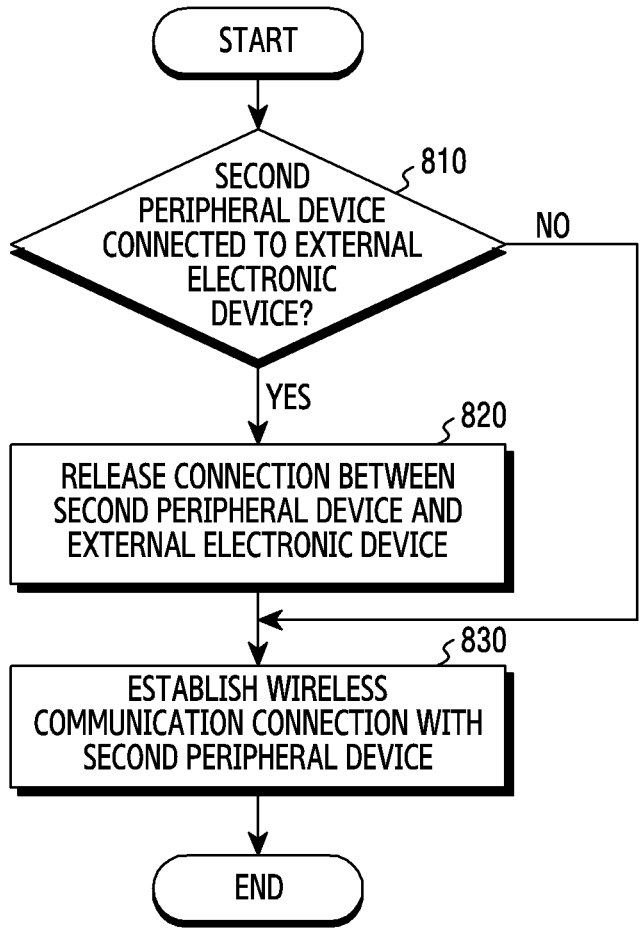
FIG. 8 illustrates a process, performed by an electronic device, for releasing a connection state between a peripheral device and an external electronic device and establishing a wireless communication connection with the peripheral device according to an embodiment.

FIG. 8 illustrates an operation in which the electronic device 100 releases a connection state between a peripheral device and an external electronic device and establishes a wireless communication connection with the peripheral device according to various embodiments. In some embodiments, the operations of FIG. 8 may be performed after operation 630 of FIG. 6. Alternatively or additionally, the operations of FIG. 8 may be performed, based on at least one piece of information. The at least one piece of information may include information on a previously scanned and stored peripheral device, information on a previously scanned and stored peripheral device having a specific profile, information on the same account acquired from a server (e.g., the server 1003 of FIG. 10), and/or information on a previously connected peripheral device forwarded from another electronic device through one function (e.g., a smart switch) of the electronic device 100.

In operation 810 according to an embodiment, the processor 310 may identify whether the second peripheral device 302 is connected to an external electronic device (e.g., a notebook computer). The processor 310 may acquire information on at least one connection state (e.g., a connection state between the second peripheral device 302 and an external electronic device 902) from the external electronic device (e.g., the external electronic device 902 of FIG. 9) and/or the server 1003, and identify whether the second peripheral device 302 has been connected to the external electronic device 902. For example, the external electronic device 902 may transmit information related to communication establishment with the second peripheral device 302, to the electronic device 100. In another example, the external electronic device 902 may transmit the information related to the communication establishment with the second peripheral device 302, to a server (e.g., the server 1003 of FIG. 10). The server 1003 may transmit the related information to the electronic device 100.

In an embodiment, the processor 310 may make an identification request for a communication connection between the second peripheral device 302 and the external electronic device 902, to the external electronic device 902 and/or to the server 1003, and identify whether the peripheral device 302 has established a communication connection with the external electronic device 902.

In an embodiment, when the second peripheral device 302 is not connected to the external electronic device (e.g., a notebook computer), the processor 310 may perform operation 830. That is, if or when the processor 310 scans the second peripheral device 302 and the second peripheral device 302 is not connected to another external electronic device, the processor 310 may establish a wireless communication connection the second peripheral device 302 without a separate disconnection process.

In operation 820 according to an embodiment, the processor 310 may release a communication connection between the second peripheral device 302 and the external electronic device. If or when the processor 310 determines that the second peripheral device 302 intended to be connected has been already connected to the external electronic device (e.g., the notebook computer), the processor 310 may release the communication connection between the second peripheral device 302 and the external electronic device.

In an embodiment, the processor 310 may transmit a control request signal (e.g., a release request signal) to the external electronic device, and allow the external electronic device to release the wireless communication connection with the second peripheral device 302. In an embodiment, the processor 310 may directly transmit the control request signal (e.g., the release request signal) to the external electronic device through the wireless communication circuit 320. A related scenario may be further described with reference to FIG. 9.

In an embodiment, the processor 310 may transmit a control request signal (e.g., a release request signal) to the external electronic device through a server. The processor 310 may allow the server to transmit the control request signal (e.g., the release request signal) to the external electronic device, rather than directly transmitting the control request signal to the external electronic device. The server may store user account information on the electronic device 100 and user account information on the external electronic device, and determine whether a wireless communication connection is established with another device (e.g., the second peripheral device 302). A related scenario may be further described with reference to FIG. 10.

In operation 830 according to an embodiment, the processor 310 may establish a wireless communication connection with the second peripheral device 302. An example process for establishing the wireless communication connection with the second peripheral device 302 may correspond to operation 430 of FIG. 4.

Figure 9:
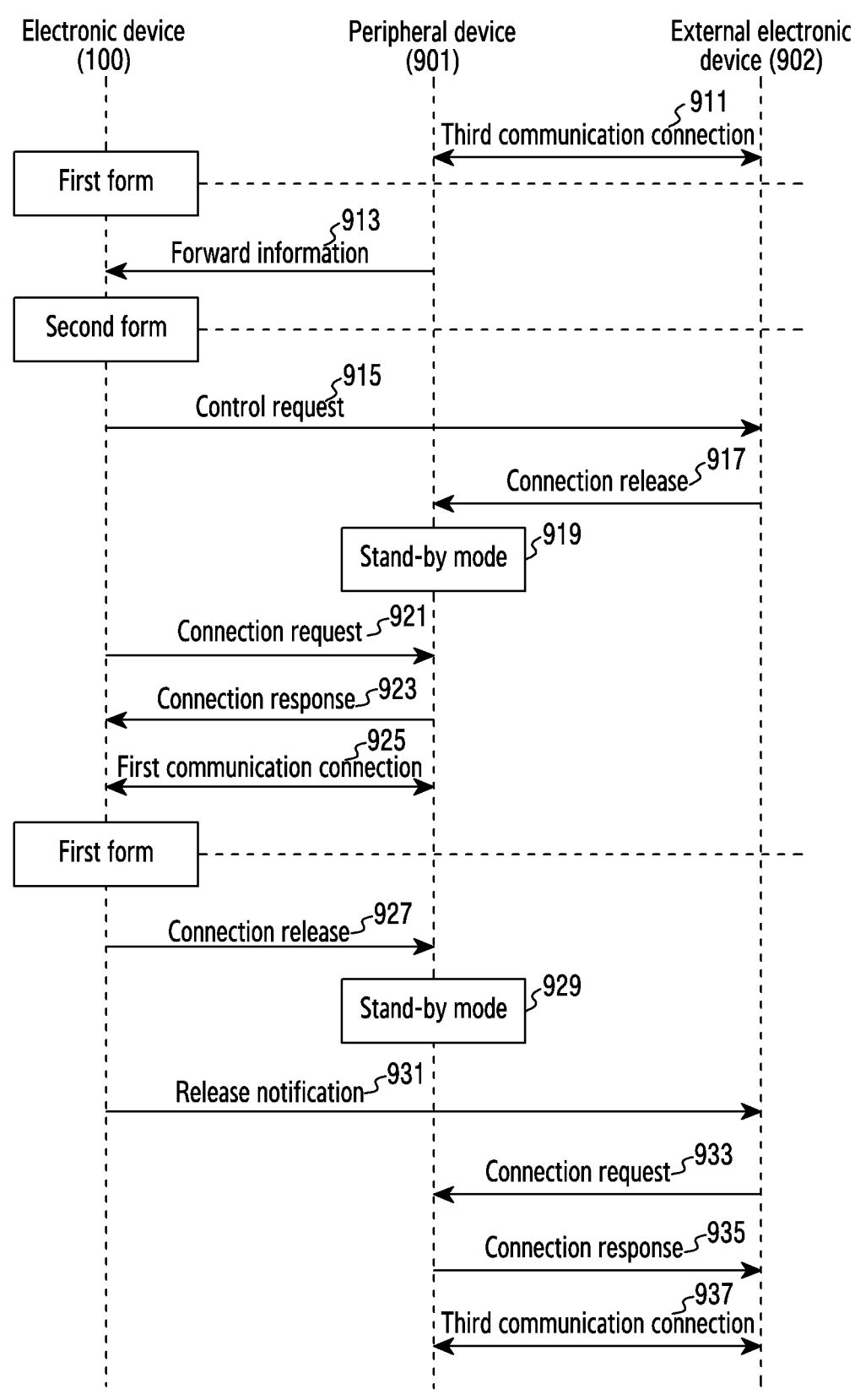
FIG. 9 illustrates a scenario, performed by an electronic device, for releasing a communication connection between a peripheral device and an external electronic device and establishing a wireless communication connection with the peripheral device according to an embodiment.

FIG. 9 illustrates a scenario in which the electronic device 100 releases a communication connection between a peripheral device 901 and an external electronic device 902 and establishes a wireless communication connection with the peripheral device 901 according to an embodiment. It may be understood that the operation of the electronic device 100 is performed by the processor 310 included in the electronic device 100. The peripheral device 901 of FIG. 9 may have similar features as the peripheral devices described in reference to FIG. 3 (e.g., 301-303), and may have additional features as described herein.

In operation 911 according to embodiment, the peripheral device 901 and the external electronic device 902 may form a third communication connection. The third communication connection may be formed earlier than a first communication connection to be described below. Alternatively or additionally, the third communication connection may have been formed after the first communication connection to be described below.

In operation 913 according to embodiment, the peripheral device 901 may forward information on at least one peripheral device 901 stored in association with registered user account information, to the electronic device 100. For example, the processor 310 may receive information indicating that the peripheral device 901 is connected to the external electronic device 902, and information on the peripheral device 901, from the peripheral device 901.

In an embodiment, in response to the electronic device 100 changing from the first form 101 to the second form 102, the electronic device 100 may establish a wireless communication connection with the peripheral device (e.g., a Bluetooth keyboard) 901 that is connected to the external electronic device (e.g., a notebook computer) 902. In operation 917 according to embodiment, the electronic device 100 may release the wireless communication connection between the external electronic device 902 and the peripheral device 901 in order to establish a wireless communication connection with the peripheral device 901. In operation 915, the electronic device 100 may transmit a control request signal to the external electronic device 902 that is connected to the peripheral device in order to release the wireless communication connection between the external electronic device 902 and the peripheral device 901. The electronic device 100 may request a control right on the peripheral device 901 to the external electronic device 902, in order to detect the control right from the external electronic device 902 having the control right on the peripheral device 901. That is, if or when the electronic device 100 does not release the control right of the external electronic device 902 on the peripheral device 901, the electronic device 100 may release the wireless communication connection between the peripheral device 901 and the external electronic device 902, because a wireless communication connection with the peripheral device 901 may be difficult.

In an embodiment, the external electronic device 902 may determine whether the control request signal of the electronic device 100 is a valid signal. If or when the control request signal of the electronic device 100 is valid, in operation 917, the external electronic device 902 may release the connection to the peripheral device 901.

In operation 919 according to embodiment, the peripheral device 901 may enter a stand-by mode, that is, a mode in which communication connection with the electronic device 100 is possible. For example, the peripheral device 901 may operate in a page scan mode after a second communication connection is released. The stand-by mode may employ the operations described above in reference to operation 727 of FIG. 7.

In operation 921 according to embodiment, the electronic device 100 may transmit a connection request signal to the peripheral device 901. In operation 923, after receiving the connection request signal, the peripheral device 901 may transmit a response signal to the connection request signal, to the electronic device 100.

In operation 925 according to embodiment, the electronic device 100 may establish a first communication connection with the peripheral device 901 that is disconnected from the external electronic device 902 and is in the stand-by mode.

In operation 927 according to embodiment, if or when the electronic device 100 changes to the first form 101 in a state in which the wireless communication connection with the peripheral device 901 is established, the electronic device 100 may release the first communication connection with the peripheral device 901. In operation 929, the peripheral device 901 may enter the stand-by mode again.

In operation 931 according to embodiment, in response to the wireless communication connection with the peripheral device 901 being released, the electronic device 100 may scan the external electronic device 902 and transmit a release notification signal to the external electronic device 902. That is, by releasing the wireless communication connection with the peripheral device 901, the electronic device 100 may notify a state of the peripheral device 901 entering the stand-by mode to the external electronic device. In operation 933, the external electronic device 902 may transmit a connection request signal to the peripheral device 901. In operation 935, the peripheral device 901 may transmit a connection response signal to the external electronic device 902, based on the connection request signal. In operation 937, the external electronic device 902 may establish a reconnection (e.g., a third communication connection) with the peripheral device 901 entering the stand-by mode.

In an embodiment, an example of the external electronic device 902 is only one example, and the external electronic device 902 may include all electronic devices such as a terminal, a tablet and a desktop capable of performing an operation in response to an input of the peripheral device 901, in addition to a notebook computer. In an embodiment, an example of the peripheral device 901 is only one example, and the peripheral device 901 may include all external input devices such as a Bluetooth mouse for operating the external electronic device 902 in addition to a Bluetooth keyboard.

Figure 10:
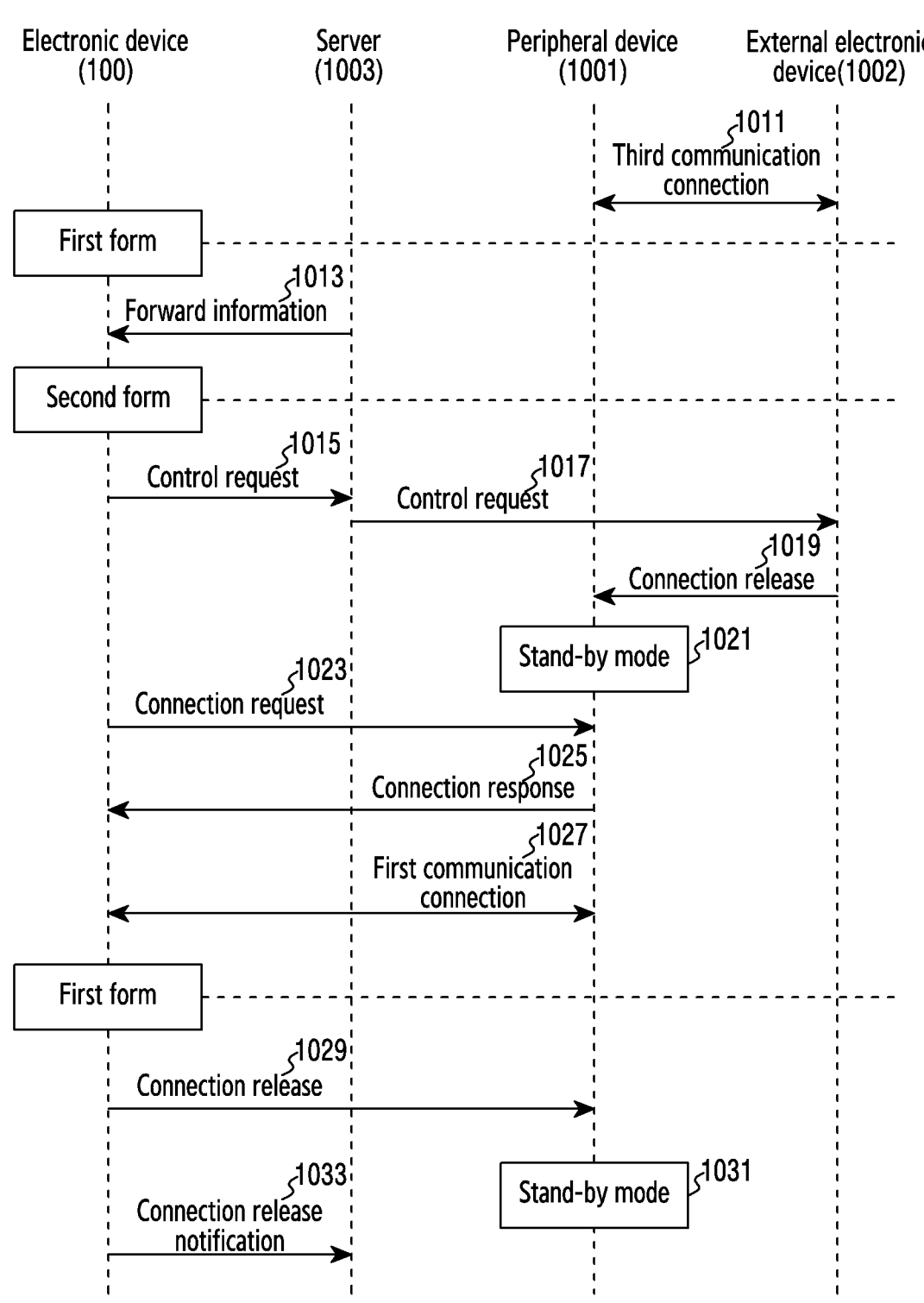
FIG. 10 illustrates a scenario, performed by an electronic device for releasing a communication connection between a peripheral device and an external electronic device through a server and establishing a wireless communication connection with the peripheral device according to an embodiment.

FIG. 10 illustrates a scenario in which the electronic device 100 releases a communication connection between a peripheral device 1001 and an external electronic device 1002 through a server 1003, and establishes a wireless communication connection with the peripheral device 1001 according to an embodiment. Alternatively to FIG. 9, FIG. 10 may be a scenario in which, rather than the electronic device 100 directly releasing the wireless communication connection between the peripheral device 1001 and the external electronic device 1002, the electronic device 100 may cause the release to be effected through the server. As such, similar operations described in FIG. 9 may be briefly described and/or omitted in describing FIG. 10. As illustrated in FIG. 10, releasing the wireless communication connection between the peripheral device 1001 and the external electronic device 1002 through the server 1003 may enhance the security of the wireless communication connection. It may be understood that the operation of the electronic device 100 is performed by the processor 310 included in the electronic device 100. The peripheral device 1001 of FIG. 10 may have similar features as the peripheral devices described in reference to FIG. 3 (e.g., 301-303), and may have additional features as described herein.

In operation 1011 according to embodiment, the peripheral device (e.g., a Bluetooth keyboard) 1001 and the external electronic device (e.g., a notebook computer) 1002 may form a wireless communication connection. The peripheral device 1001 and the external electronic device 1002 may form a third communication connection. In an embodiment, the external electronic device 1002 may transmit information related to the peripheral device 1001, to the server 1003, using registered user account information.

In operation 1013 according to embodiment, the server 1003 may forward information on the at least one peripheral device 1001 stored in association with the registered user account information, to the electronic device 100. For example, the processor 310 may receive information indicating that the peripheral device 1001 is connected to the external electronic device 1002, and information on the peripheral device 1001, from the server 1003.

In an embodiment, the electronic device 100 may change from the first form 101 to the second form 102. In operation 1015, the electronic device 100 may release the wireless communication connection between the external electronic device 1002 and the peripheral device 1001 in order to establish the first wireless communication with the peripheral device 1001 that is set to be connected to the second form. The electronic device 100 may transmit a control request signal to the server 1003 in order to release the wireless communication connection between the external electronic device 1002 and the peripheral device 1001. The release request may be a request for releasing a connection between the peripheral device 1001 and the external electronic device 1002.

In operation 1015 according to embodiment, the electronic device 100 may transmit at least one piece of information to the server 1003, along with transmitting a release request signal. For example, the electronic device 100 may transmit the information on the peripheral device 1001 to which the electronic device 100 intends to connect (e.g., device information on the peripheral device mapped to the second form 102, profile information, and/or or account information).

In operation 1015 according to embodiment, the electronic device 100 may request a control right on a peripheral device having a specific profile (e.g., HSP, A2DP, or HID) mapped to be communication connected to the second form 102.

In operation 1017 according to embodiment, the electronic device 100 and/or the server 1003 may receive an advertising signal from the external electronic device 1002, and may identify that the external electronic device 1002 is within a communicable range. If or when identifying that the external electronic device 1002 is within the communicable range, the electronic device 100 or the server 1003 may forward a connection release command (e.g., a release command for the third communication connection between the peripheral device 1001 and the external electronic device 1002) to the corresponding external electronic device 1002.

In operation 1017 according to embodiment, in response to receiving the control request signal from the electronic device 100, the server 1003 may forward connection release related information to the external electronic device 1002 having a connection control right on the peripheral device 1001 with reference to connection information stored in the server 1003. The server 1003 may control the external electronic device 1002 to disconnect from the peripheral device 1001. That is, the electronic device 100 may release a connection between the external electronic device 1002 and the peripheral device 1001 intended to be connected, through the server 1003, without directly making a release request to the external electronic device 1002.

In operation 1017 according to embodiment, the server 1003 may transmit a request for releasing the third communication connection to the external electronic device 1002. The server 1003 may identify that the peripheral device 1001 and the external electronic device 1002 are connected to each other, based on at least one of information received from the external electronic device 1002 or information received from the peripheral device 1001. The server 1003 may transmit a request of releasing the third communication connection to the external electronic device 1002, based on identifying that the peripheral device 1001 and the external electronic device 1002 are connected to each other.

In operation 1019 according to embodiment, in response to receiving the release request signal from the server 1003, the external electronic device 1002 may release the third communication connection with the peripheral device 1001.

In an embodiment, the external electronic device 1002 may occupy the peripheral device 1001, without disconnecting from the peripheral device 1001. That is, the peripheral device 1001 may maintain the third communication connection with the external electronic device 1002 through multi-pairing (or multi-connection), while forming the first communication connection with the electronic device 100 through operation 1027 below. For example, the external electronic device 1002 may be a smart watch, and if or when the electronic device 100 occupies and uses a path of the peripheral device 1001, the external electronic device 1002 may maintain the third communication connection, while stopping a control over the peripheral device 1001. Alternatively or additionally, if or when the external electronic device 1002 occupies and uses the path of the peripheral device 1001, the electronic device 100 may maintain the first communication connection, while stopping a control over the peripheral device 1001.

In operation 1021 according to embodiment, after the third communication connection with the external electronic device 1002 is released, the peripheral device 1001 may enter a stand-by mode, that is, a mode in which a wireless communication (e.g., Bluetooth) connection with the electronic device 100 is possible. For example, after the third communication connection is released, the peripheral device 1001 may operate in a page scan mode. The peripheral device 1001 may be set to automatically operate in the page scan mode after the third communication connection is released, or may operate in the page scan mode if or when the third communication connection is released after a communication signal of operating in the page scan mode is received from the electronic device 100. In an embodiment, after the peripheral device 1001 enters the page scan mode, the peripheral device 1001 may adjust at least one of a window size of page scan, an interval between windows of the page scan, or an interval of application of a current applied for signal reception.

In operation 1023 according to embodiment, the processor 310 may establish a first communication connection, in response to the peripheral device 1001 entering the stand-by mode. The processor 310 may make a connection request to the peripheral device 1001 that has entered the stand-by mode. In operation 1025, the peripheral device 1001 may transmit a connection response signal to the electronic device 100, in response to the connection request signal of the electronic device 100. In operation 1027, the electronic device 100 may establish the first communication connection with the peripheral device 1001.

In an embodiment, in operations 1023 and 1025 of FIG. 10, the electronic device 100 and the peripheral device 1001 may directly perform a connection operation so as to establish the first communication connection. In other embodiments, the electronic device 100 and the peripheral device 1001 may form the first communication connection via the server 1003. For example, the processor 310 may transmit a request for connection with the peripheral device 1001, to the server 1003. Information (e.g., connection request information with the peripheral device 1001) that the processor 310 transmits to the server 1003 may be forwarded to the peripheral device 1001 through short-range communication.

In operation 1029 according to embodiment, in response to the electronic device 100 changing from the second form 102 to the first form 101 again, the processor 310 may release the first communication connection with the peripheral device 1001. In operation 1031, after the first communication connection with the electronic device 100 is released, the peripheral device 1001 may enter the stand-by mode.

In operation 1033 according to embodiment, the processor 310 may notify the server 1003 that the first communication connection with the peripheral device 1001 has been released. In response to receiving information indicating that the first communication connection between the electronic device 100 and the peripheral device 1001 has been released, the server 1003 may transmit information on the peripheral device 1001 (e.g., information that the first communication connection between the peripheral device 1001 and the electronic device 100 is released, and/or device information on the peripheral device 1001), to a previously connected external electronic device 1002.

Figure 11:
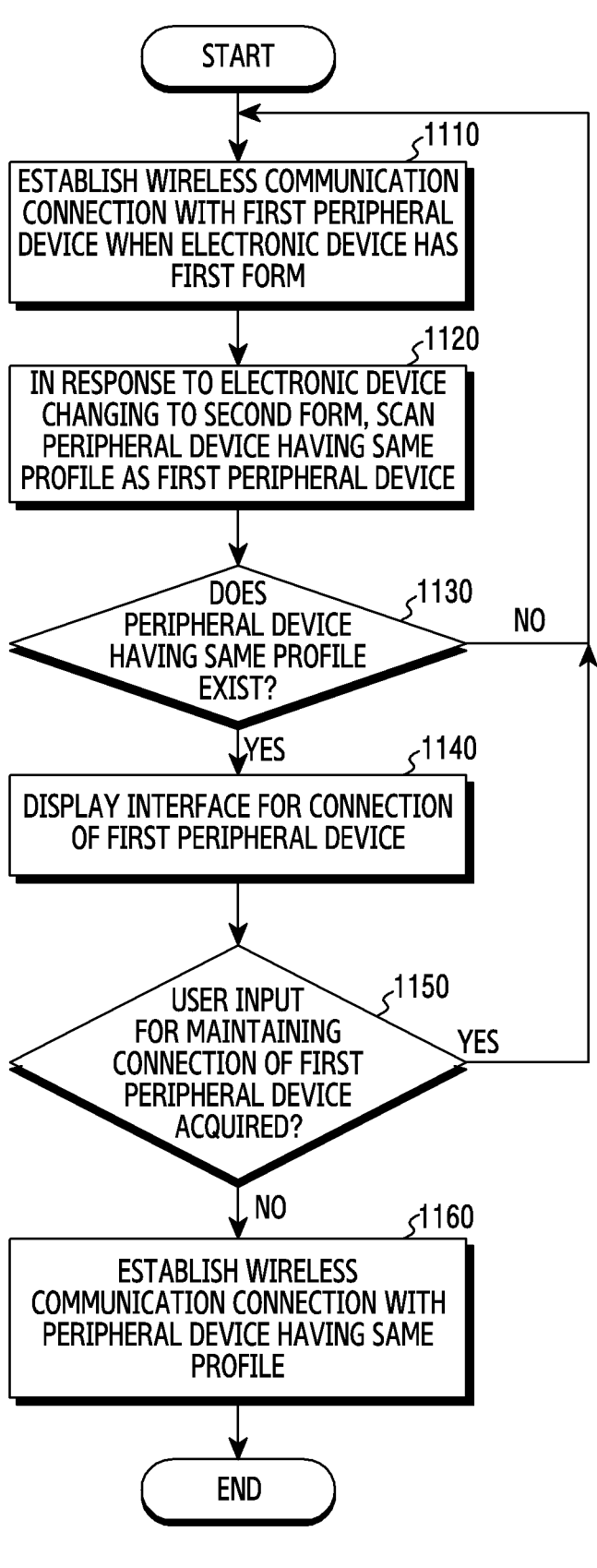
FIG. 11 illustrates a process for determining the maintenance of a connection to a peripheral device connected to the electronic device in a first form, according to an embodiment.

FIG. 11 is a flowchart for determining the maintenance of connection to a peripheral device connected to the first form 101 according to an embodiment.

In operation 1110 according to embodiment, the processor 310 may establish a wireless communication connection with the first peripheral device 301 if or when the electronic device 100 has the first form 101. For example, operation 1110 may correspond to operation 410 of FIG. 4.

In operation 1120 according to embodiment, in response to the electronic device 100 being changed from the first form 101 to the second form 102, the processor 310 may scan a peripheral device (e.g., the third peripheral device 303 of FIG. 3) having the same profile as the first peripheral device 301. For example, the same profile may be an A2DP for music playback.

In an embodiment, the processor 310 may execute a first application (e.g., a movie) in the first form 101 of the electronic device 100, and if or when the electronic device 100 is changed from the first form 101 to the form 102, may execute the first application (e.g., the movie) on a wider screen. If or when the electronic device 100 outputs a sound through the first peripheral device (e.g., a wireless earphone) 301 in the first form 101 while the electronic device 100 is changed to the second form 102, the processor 310 may output a sound through the third peripheral device (e.g., the wireless speaker) 303. That is, if or when a display becomes wider during movie watching, the processor 310 may determine as an intention of the user for intending to watch a movie in a movie watching mode, and establish a wireless communication connection with the third peripheral device (e.g., the wireless speaker) 303.

In operation 1130 according to embodiment, the processor 310 may identify whether a peripheral device having the same profile exists. The processor 310 may transmit a scan signal to the peripheral device having the same profile and acquire a scan response signal from the peripheral device having the same profile. The processor 310 may determine whether the peripheral device having the same profile exists, based on the scan response signal.

In an embodiment, if or when the peripheral device having the same profile does not exist, the processor 310 may perform operation 1110. If or when the peripheral device having the same profile exists, the processor 310 may perform operation 1140.

In operation 1140 according to embodiment, the processor 310 may display an interface related to connection of the first peripheral device 301. The processor 310 may display the interface related to the connection of the first peripheral device 301 in one region of the flexible display 110, in order to determine the maintenance of connection to the first peripheral device 301 connected if or when the electronic device 100 has the first form 101.

In an embodiment, in response to the electronic device 100 being changed from the first form 101 to the second form 102, the processor 310 may present a message requesting whether to maintain or release the connection to the first peripheral device 301 through the user interface.

In operation 1150 according to embodiment, the processor 310 may determine whether the processor 310 has acquired a user input of maintaining the connection of the first peripheral device 301. The user input may include at least one of a touch input through the interface, and a voice input responsive to the message. An additional description of operation 1150 may be made with reference to FIG. 12.

In an embodiment, the processor 310 may perform operation 1110 if or when acquiring the user input of maintaining the connection of the first peripheral device 301. If or when the processor 310 fails to acquire the user input of maintaining the connection of the first peripheral device 301, the processor 310 may perform operation 1160.

In operation 1160 according to embodiment, the processor 310 may establish a wireless communication connection with the peripheral device having the same profile. If or when the processor 310 fails to acquire the user input of maintaining the connection of the first peripheral device 301 connected to the first form 101, the processor 310 may establish a wireless communication connection with the peripheral device having the same profile as the first peripheral device 301. In response to acquiring a user input of releasing the connection of the first peripheral device 301, the processor 310 may establish the wireless communication connection with the peripheral device having the same profile.

Figure 12:
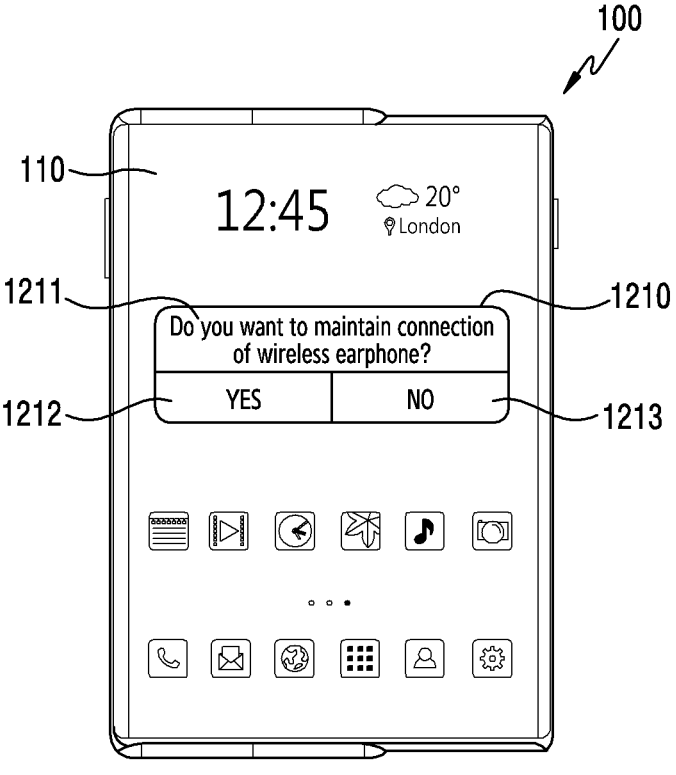
FIG. 12 illustrates an interface for requesting the maintenance of a connection to a peripheral device connected to the electronic device in a first form according to an embodiment.

FIG. 12 illustrates an interface for requesting user input indicating whether the maintenance of connection to a peripheral device connected to the first form 101 according to an embodiment.

Referring to FIG. 12, in response to the electronic device 100 changing from the first form 101 to the second form 102, the processor 310 may display an interface 1210 related to a communication connection with the first peripheral device 301 in a region of the flexible display 110. Alternatively or additionally, the processor 310 may display the interface 1210 if or when the electronic device 100 changes from the second form 102 to the first form 101.

In an embodiment, the processor 310 may display a message 1211 requesting user input indicating whether to maintain a wireless communication connection of the peripheral device connected to the first form 101 of the electronic device 100, through the interface 1210. For example, in response to the electronic device 100 changing from the first form 101 to the second form 102, the processor 310 may display a message such as "Do you want to maintain the connection of a wireless earphone?" or "Do you want to switch to a newly discovered Bluetooth speaker?".

In an embodiment, the processor 310 may acquire a user input responsive to the message 1211, and perform an operation corresponding to the user input. For example, if or when the processor 310 acquires a user response (e.g., "Yes") to a message such as "Do you want to maintain the connection of a wireless earphone?", the processor 310 may maintain the connection of the wireless earphone connected to the first form 101 even in the second form 102 of the electronic device 100, without establishing a wireless communication connection with a Bluetooth speaker mapped to be connected to the second form 102 of the electronic device 100. For example, if or when the processor 310 acquires a user response (e.g., "No") to a message such as "Do you want to maintain the connection of a wireless earphone?", the electronic device 100 is changed to the second form whereby the processor 310 may release the connection of the wireless earphone connected to the first form 101, and establish a wireless communication connection with a Bluetooth speaker mapped to be connected to the second form. For example, if or when the processor 310 acquires a user response (e.g., "Yes") to a message such as "Do you want to switch to a newly discovered Bluetooth speaker?", the electronic device 100 is changed to the second form, whereby the processor 310 may release the connection of the wireless earphone connected to the first form 101, and establish the wireless communication connection with the Bluetooth speaker mapped to be connected to the second form. For example, if or when the processor 310 acquires a user response (e.g., "No") to a message such as "Do you want to switch to a newly discovered Bluetooth speaker?", the processor 310 may maintain the connection of the wireless earphone connected to the first form 101, even in the second form 102 of the electronic device 100, without establishing the wireless communication connection with the Bluetooth speaker mapped to be connected to the second form 102 of the electronic device 100.

In an embodiment, the processor 310 may display the message 1211 through the flexible display 110 and simultaneously output the message 1211 by a voice. In an embodiment, the processor 310 may output the message 1211 only by the voice, without displaying the message 1211 through the flexible display 110. That is, the processor 310 may output the message 1211 only by voice in order not to obstruct a visibility of an interface that may be displayed through the flexible display 110.

In an embodiment, the processor 310 may acquire a first input 1212 responsive to the message 1211. For example, the processor 310 may acquire a user input (e.g., "Yes") of maintaining a wireless communication connection of a peripheral device connected to the first form 101. The first input may be inputted through a voice command. In an embodiment, if or when the processor 310 acquires the first input 1212, the processor 310 may maintain the connection to the previously connected peripheral device (e.g., the wireless earphone), even though the electronic device 100 changes from the first form 101 to the second form 102.

In an embodiment, the processor 310 may acquire a second input 1213 responsive to the message 1211. For example, the processor 310 may acquire a user input (e.g., "No") of not maintaining a wireless communication connection of a peripheral device (e.g., a wireless earphone) connected to the first form 101. The second input may be inputted through a voice command. In an embodiment, if or when the processor 310 acquires the second input 1213, in response to the change of the electronic device 100 from the first form 101 to the second form 102, the processor 310 may release a connection to a previously connected peripheral device (e.g., a wireless earphone), and establish a wireless communication connection to a peripheral device (e.g., a wireless speaker) that is set to be connected to the second form 102.

In an embodiment, in response to the electronic device 100 being changed from the second form 102 to the first form 101, the processor 310 may display a message requesting user input indicating whether to maintain a wireless communication connection of a peripheral device connected to the second form 102, in one region of the flexible display 110. For example, in response to the electronic device 100 being changed from the second form 102 to the first form 101, the processor 310 may display a message such as "Do you want to maintain a connection of a wireless speaker?". The processor 310 may display the message through the flexible display 110 together with a voice output, or output the message only by a voice.

Figure 13:
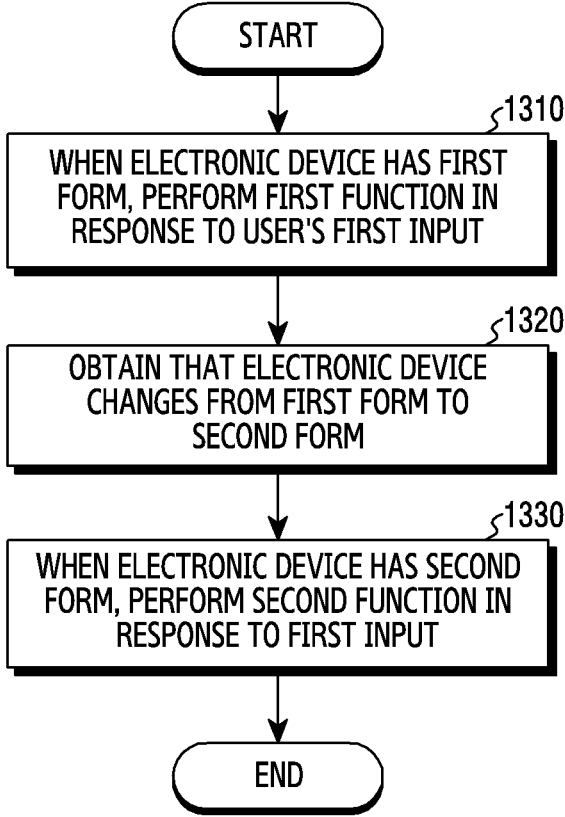
FIG. 13 illustrates a process in which a function performed responsive to the same input is changed according to a form change of an electronic device according to an embodiment.

FIG. 13 illustrates a process in which a function performed responsive to the same input is changed based on a form change of an electronic device according to an embodiment.

In operation 1310 according to embodiment, if or when the electronic device 100 has the first form 101, the processor 310 may perform a first function in response to a third user input. The third user input may include at least one of a touch input to the flexible display 110, an input to an external device (e.g., an electronic pen) interlocked with the electronic device 100, an input to the first function key 151, and an input to the second function key 152.

In an embodiment, the processor 310 may perform the first function corresponding to the third input in the first form 101 of the electronic device 100. For example, if or when photographing using a camera application in the first form 101 of the electronic device 100, the processor 310 may capture a preview image in response to acquiring a first button input to the external device (e.g., the electronic pen).

In operation 1320 of an embodiment, the processor 310 may detect that the electronic device 100 is changed from the first form 101 to the second form 102. Operation 1320 may correspond to operation 420 of FIG. 4.

In operation 1330 according to embodiment, if or when the electronic device 100 has the second form 102, the processor 310 may perform a second function in response to the third input. That is, if or when the electronic device 100 acquires the same input as the third input acquired in the first form 101, the processor 310 may perform a second function which is different from the first function performed in the first form 101. For example, if or when photographing using the camera application in the second form 102 of the electronic device 100, the processor 310 may change a camera that is acquiring image data (e.g., change from an ultra-wide-angle camera to a telephoto camera), or change a photographing mode (e.g., change from a photo mode to a video mode), in response to acquiring the first button input to the external device (e.g., the electronic pen). The processor 310 may capture a preview image after changing the photographing mode.

The description of the third input, the first function, and the second function described in FIG. 13 are only illustrative examples, and FIG. 13 illustrates that, even though the same input is acquired, a different function may be performed based on a form change of the electronic device 100. Accordingly, the electronic device 100 is not limited to the above example, and various examples of performing respectively different functions according to a form in response to the same input may be applied.

Figure 14:
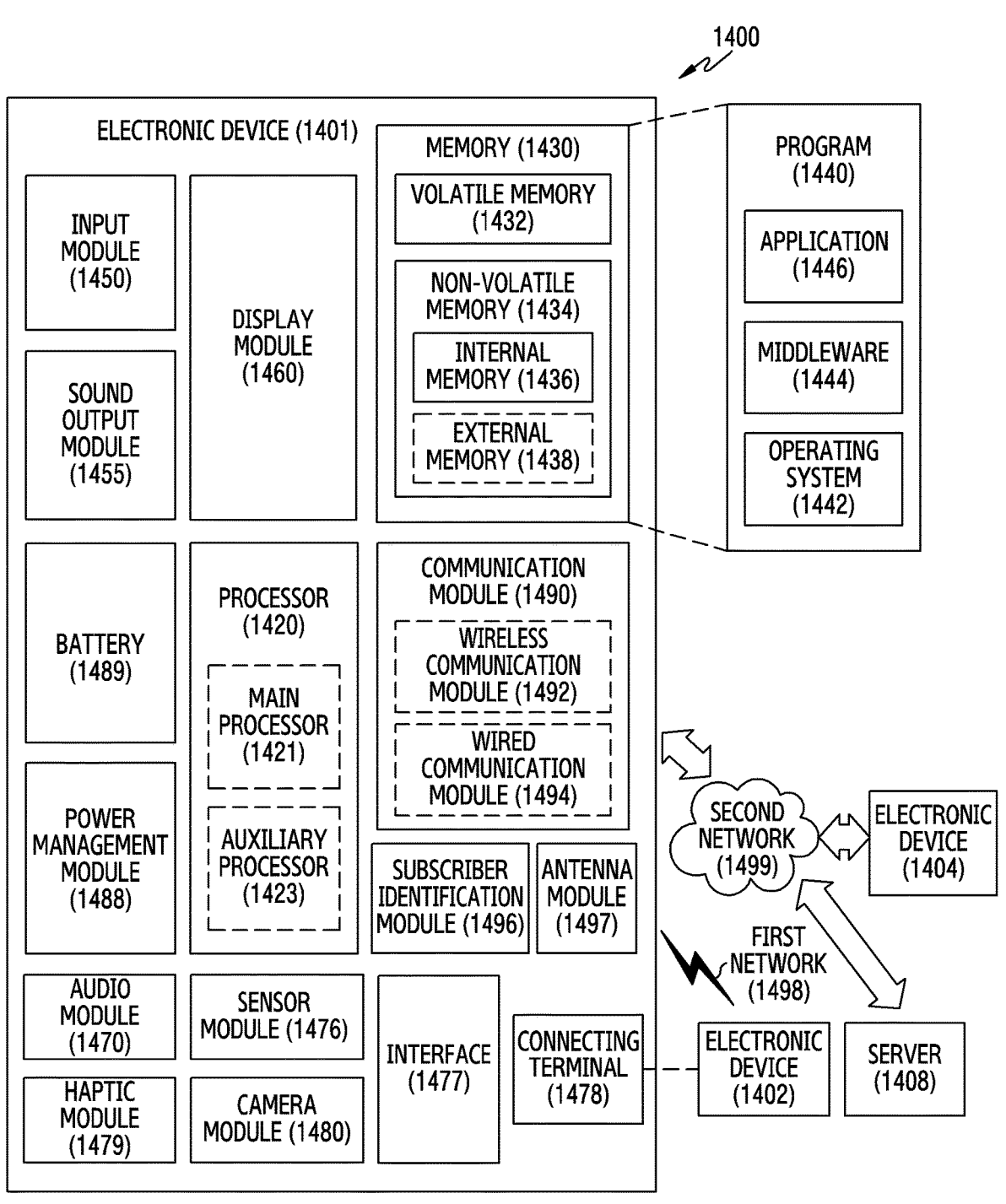
FIG. 14 is a block diagram of an electronic device in a network environment, according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) (1496), and/or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing and/or computations. According to one embodiment, as at least part of the data processing and/or computations, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, if or when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., via one or more wires) and/or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). For example, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if or when the electronic device 1401 should perform a function or a service automatically, and/or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

In an embodiment, the electronic device 100 may include a housing which includes the first housing 161 and the second housing 162 mechanically coupled to the first housing 161. The electronic device 100 may have the first form 101 or the second form 102 according to a relative position relationship between the first housing 161 and the second housing 162. The electronic device 100 may include the at least one sensor 330 detecting a relative position relationship between the first housing 161 and the second housing 162, the at least one wireless communication circuit 320, the flexible display 110 deformed according to the relative position relationship between the first housing 161 and the second housing 162, and the at least one processor 310. If or when the electronic device 100 has the first form 101, the processor 310 may establish a wireless communication connection (e.g., the first communication connection 711 of FIG. 7) with the first peripheral device 301 mapped to the first form 101 using the at least one wireless communication circuit 320. The processor 310 may detect that the electronic device 100 is changed from the first form 101 to the second form 102 using the at least one sensor 330. In response to the electronic device 100 being changed to the second form 102, the processor 310 may establish a wireless communication connection (e.g., the second communication connection 723 of FIG. 7) with a second peripheral device (e.g., the second peripheral device 302 and/or third peripheral device 303 of FIG. 3) mapped to the second form 102 using the at least one wireless communication circuit 320.

In an embodiment, in response to the electronic device 100 being changed from the first form 101 to the second form 102, the processor 310 may scan the second peripheral device 302 and/or 303 without input from a user. The processor 310 may establish a wireless communication connection (e.g., the second communication connection 723 of FIG. 7) with the scanned second peripheral device 302 and/or 303.

In an embodiment, the second peripheral device 302 may be a device that has not been configured to establish a wireless communication connection in the first form 101.

In an embodiment, in response to the electronic device 100 changing from the second form 102 to the first form 101, the processor 310 may release the wireless communication connection (e.g., the second communication connection 723 of FIG. 7) to the second peripheral device 302 and/or 303.

In an embodiment, in response to the electronic device 100 changing from the first form 101 to the second form 102, the processor 310 may release a wireless communication connection (e.g., the first communication connection 711 of FIG. 7) with the first peripheral device 301, and establish a wireless communication connection with the second peripheral device (e.g., the third peripheral device 303 of FIG. 3) having the same profile as the first peripheral device 301.

In an embodiment, in response to the electronic device 100 changing from the first form 101 to the second form 102, the processor 310 may identify whether a second peripheral device (e.g., the peripheral device 1001 of FIG. 10) has been wireless communication connected (e.g., the third communication connection 1011 of FIG. 10) to an external electronic device (e.g., the external electronic device 1002 of FIG. 10). If or when the second peripheral device 1001 has been wireless communication connected (e.g., the third communication connection 1011) with the external electronic device 1002, the processor 310 may transmit a release request signal to the external electronic device 1002, in order to disconnect the second peripheral device 1001 and the external electronic device 1002.

In an embodiment, the processor 310 may transmit a control signal to a server (e.g., the server 1003 of FIG. 10). In response to the control signal, the server 1003 may transmit the release request signal to the external electronic device 1002, and release a wireless communication connection (e.g., the third communication connection 1011 of FIG. 10) between the second peripheral device 1001 and the external electronic device 1002.

In an embodiment, when the electronic device 100 changes from the first form 101 to the second form 102, in response to the change, the processor 310 may display a user interface 1210 requesting user input indicating whether to maintain the wireless communication connection of the first peripheral device 301 through one region of the flexible display 110.

In an embodiment, if or when the electronic device 100 changes from the first form 101 to the second form 102, the processor 310 may output the message 1211 requesting user input indicating whether to maintain the connection with the first peripheral device 301. If or when the processor 310 acquires user input indicating to maintain the wireless communication connection of the first peripheral device 301 in response to the message 1211, the processor 310 may maintain the wireless communication connection of the first peripheral device 301. If or when the processor 310 acquires user input indicating to release the wireless communication connection of the first peripheral device 301 in response to the message 1211, the processor 310 may release the wireless communication connection with the first peripheral device 301, and may establish a wireless communication connection with the second peripheral device (e.g., the third peripheral device 303 of FIG. 3) having the same profile as the first peripheral device 301.

In an embodiment, the processor 310 may perform a first operation in response to acquiring a first user input to an external device interlocked with the electronic device 100, in the first form 101, and perform a second operation different from the first operation in response to acquiring the first user input to the external device, in the second form 102.

In an embodiment, a method for operating the electronic device 100 may include, if or when the electronic device 100 has the first form 101, establishing a wireless communication connection (e.g., the first communication connection 711 of FIG. 7) with the first peripheral device 301 mapped to the first form 101 using the at least one wireless communication circuit 320, and detecting that the electronic device 100 changes from the first form 101 to the second form 102 using the at least one sensor 330, and in response to changing to the second form 102, establishing a wireless communication connection (e.g., the second communication connection 723 of FIG. 7) with a second peripheral device (e.g., the second peripheral device 302 and/or the third peripheral device 303 of FIG. 3) mapped to the second form 102 using the at least one wireless communication circuit 320.

In an embodiment, the operating method of the electronic device 100 may include, in response to the electronic device 100 changing from the first form 101 to the second form 102, establishing the wireless communication connection 723 with the second peripheral device 302 and/or 303, without a user input, and in response to the electronic device 100 changing from the second form 102 to the first form 101, releasing the wireless communication connection 723 to the second peripheral device 302 and/or 303.

In an embodiment, the operating method of the electronic device 100 may include, in response to the electronic device 100 changing from the first form 101 to the second form 102, disconnecting the wireless communication connection (e.g., the first communication connection 711 of FIG. 7) with the first peripheral device 301, and establishing a wireless communication connection with the second peripheral device (e.g., the third peripheral device 303 of FIG. 3) having the same profile as the first peripheral device 301.

In an embodiment, the operating method of the electronic device 100 may include, in response to the electronic device 100 changing from the first form 101 to the second form 102, identifying whether the second peripheral device (e.g., the peripheral device 901 of FIG. 9) has been wireless communication connected (e.g., the wireless communication connection 911 of FIG. 9) to an external electronic device (e.g., the external electronic device 902 of FIG. 9), and if or when the second peripheral device 901 has been wireless communication connected 911 to the external electronic device 902, releasing the wireless communication connection 911 between the second peripheral device 901 and the external electronic device 902.

In an embodiment, the operating method of the electronic device 100 may include, if or when the electronic device 101 changes from the first form 101 to the second form 102, outputting the user interface 1210 requesting user input indicating whether to maintain a connection of the first peripheral device 301, and if or when acquiring a user input indicating to maintain the wireless communication connection of the first peripheral device 301 with respect to the user interface 1210, maintaining the wireless communication connection of the first peripheral device, and if or when acquiring a user input indicating to release the connection of the first peripheral device 301 with respect to the user interface 1210, releasing the wireless communication connection with the first peripheral device 301, and establishing a wireless communication connection with the second peripheral device (e.g., the third peripheral device 303 of FIG. 3) having the same profile as the first peripheral device.

In an embodiment, the electronic device 100 may include at least one wireless communication circuit 320, at least one sensor 330, a flexible display 110, and at least one processor 310. If or when the first area of the flexible display 110 is activated, the processor 310 may establish a wireless communication connection with the first peripheral device 301. If or when the second area of the flexible display 110 is activated, the processor 310 may establish a wireless communication connection with a second peripheral device (e.g., the second peripheral device 302 and/or third peripheral device 303 of FIG. 3), the second area being greater than the first area.

According to an embodiment, an activation region of the flexible display 110 may be varied according to a form of the electronic device 100. For example, if or when the electronic device 100 has the first form, an area of the display 110 visible from the outside among the flexible display 110 may correspond to a first area, and resultantly the first area of flexible display 110 may be activated. In another example, if or when the electronic device 100 has the second form, an area of the display 110 visible from the outside among the flexible display 110 may correspond to a second area, and resultantly the second area of the flexible display 110 may be activated.

According to an embodiment, an activation region of the flexible display 110 may be varied even while the electronic device 100 maintains the same form. For example, if or when the electronic device has the first form, the first area of the flexible display 110 may be activated. In one example, if or when the electronic device 100 has the first form, the activation region of the flexible display 110 may be changed from the first area to the second area. Resultantly, while the electronic device 100 maintains the same form (e.g., the first form), the activation region of the flexible display 110 may be varied.

In an embodiment, in response to the second area of the flexible display 110 being activated, the processor 310 may establish the wireless communication connection with the second peripheral device 302 and/or 303 without a user input. In response to the second area of the flexible display 110 being activated and then the first area being activated, the processor 310 may release the wireless communication connection to the second peripheral device 302 and/or 303. The second peripheral device 302 and/or 303 may be a device which has not been configured to establish a wireless communication if or when the first area of the flexible display 110 is activated.

In an embodiment, in response to the second area of the flexible display 110, the processor 310 may release the wireless communication connection with the first peripheral device 301, and establish a wireless communication connection with the second peripheral device (e.g., the third peripheral device 303 of FIG. 3) having the same profile as the first peripheral device 301.

In an embodiment, in response to the second area of the flexible display 110 being activated, the processor 310 may identify whether the second peripheral device (e.g., the peripheral device 901 of FIG. 9) has been wireless communication connected to an external electronic device (e.g., the external electronic device 902 of FIG. 9). If or when the second peripheral device 901 has been wireless communication connected with the external electronic device 902, the processor 310 may release the wireless communication connection between the second peripheral device 901 and the external electronic device 902.

In an embodiment, in response to the first area of the flexible display 110 being activated, the processor 310 may perform a first operation in response to acquiring a first user input from an external device interlocked with the electronic device 100. In response to the second area of the flexible display 110 being activated, the processor 310 may perform a second operation different from the first operation in response to acquiring the first user input to the external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a housing including a first housing and a second housing connected to the first housing, the electronic device having a first form and a second form based on a relative position relationship between the first housing and the second housing;
at least one sensor configured to detect a specific relative position relationship between the first housing and the second housing;
at least one wireless communication circuit; and
at least one processor configured to electrically connect to the at least one sensor and the at least one wireless communication circuit,
wherein the at least one processor is configured to:
when the electronic device is in the first form, establish, using the at least one wireless communication circuit, a first wireless communication connection with a first peripheral device mapped to the first form,
detect, using the at least one sensor, that the electronic device changes from the first form to the second form, and
in response to detecting that the electronic device changing from the first form to the second form, establish, using the at least one wireless communication circuit, a second wireless communication connection with a second peripheral device mapped to the second form.

2. The electronic device of claim 1, wherein the at least one processor is further configured to:

in response to the electronic device changing from the first form to the second form, scan the second peripheral device without a user input, and
establish the second wireless communication connection with the scanned second peripheral device.

3. The electronic device of claim 1, wherein to establish the second wireless communication connection with the second peripheral device includes to establish the second wireless communication connection with the second peripheral device not configured to establish the second wireless communication connection in the first form.

4. The electronic device of claim 1, wherein the at least one processor is further configured to release the second wireless communication connection to the second peripheral device, in response to the electronic device changing from the second form to the first form.

5. The electronic device of claim 1, wherein the at least one processor is further configured to:
in response to the electronic device changing from the first form to the second form, release the first wireless communication connection with the first peripheral device, and establish the second wireless communication connection with the second peripheral device, a first profile of the first peripheral device matching a second profile of the second peripheral device.

6. The electronic device of claim 1, wherein the at least one processor is further configured to:
in response to the electronic device changing from the first form to the second form, identify whether the second peripheral device establishes a third wireless communication connection with an external electronic device, and
in response to identifying that the second peripheral device establishes the third wireless communication connection with the external electronic device, transmit, to the external electronic device, a first release request signal requesting the external electronic device to release the third wireless communication connection between the second peripheral device and the external electronic device.

7. The electronic device of claim 6, wherein the at least one processor is further configured to transmit a control signal to a server, the control signal causing the server to transmit, to the external electronic device, a second release request signal requesting to release the third wireless communication connection between the second peripheral device and the external electronic device.

8. The electronic device of claim 1, further comprising a flexible display disposed in the housing and forming at least a part of a front surface of the electronic device,
wherein, in response to the electronic device changing from the first form to the second form, the at least one processor is further configured to display, in a region of the flexible display, a user interface requesting user input indicating whether to maintain the first wireless communication connection of the first peripheral device.

9. The electronic device of claim 1, further comprising a flexible display disposed in the housing and forming at least a part of a front surface of the electronic device,
wherein the at least one processor is further configured to:
when the electronic device changes from the first form to the second form, output, on the flexible display, a user interface requesting a user input indicating whether to maintain the first wireless communication connection of the first peripheral device, when the electronic device obtains the user input indicating to maintain the first wireless communication connection of the first peripheral device, maintain the first wireless communication connection of the first peripheral device, and when the electronic device obtains the user input indicating to release the first wireless communication connection of the first peripheral device, release the first wireless communication connection with the first peripheral device, and establish the second wireless communication connection with the second peripheral device, a first profile of the first peripheral device matching a second profile of the second peripheral device.

10. The electronic device of claim 1, wherein the at least one processor is further configured to:

perform a first operation in response to obtaining a first user input from an external device that is interlocked with the electronic device in the first form, and perform a second operation in response to obtaining the first user input from the external device that is interlocked with the electronic device in the second form, the second operation being different to the first operation.

11. A method for operating an electronic device, comprising:

when the electronic device is in a first form, establishing, using at least one wireless communication circuit of the electronic device, a first wireless communication connection with a first peripheral device mapped to the first form;

detecting, using at least one sensor of the electronic device, that the electronic device changes from the first form to a second form; and in response to detecting that the electronic device changing from the first form to the second form, establishing, using the at least one wireless communication circuit, a second wireless communication connection with a second peripheral device mapped to the second form, wherein the electronic device has the first form or the second form based on a relative position relationship between a first housing and a second housing of the electronic device.

12. The method of claim 11, further comprising:

in response to the electronic device changing from the first form to the second form, establishing the second wireless communication connection with the second peripheral device without a user input; and in response to the electronic device changing from the second form to the first form, releasing the second wireless communication connection to the second peripheral device, the second peripheral device not having been configured to establish the second wireless communication connection in the first form.

13. The method of claim 11, further comprising:

in response to the electronic device changing from the first form to the second form, releasing the first wireless communication connection with the first peripheral device; and establishing the second wireless communication connection with the second peripheral device, a first profile of the first peripheral device matching a second profile of the second peripheral device.

14. The method of claim 11, further comprising:

in response to the electronic device changing from the first form to the second form, identifying whether the second peripheral device establishes a third wireless communication connection with an external electronic device; and in response to identifying that the second peripheral device has established the third wireless communication connection with the external electronic device, causing the third wireless communication connection to be released.

15. The method of claim 11, further comprising:

in response to detecting that the electronic device changes from the first form to the second form, outputting, to a flexible display of the electronic device, a user interface requesting user input indicating whether to maintain the first wireless communication connection of the first peripheral device;

in response to obtaining a first user input indicating to maintain the first wireless communication connection of the first peripheral device, maintaining the first wireless communication connection of the first peripheral device; and in response to obtaining a second user input indicating to release the first wireless communication connection of the first peripheral device, releasing the first wireless communication connection with the first peripheral device, and establishing the second wireless communication connection with the second peripheral device, a first profile of the first peripheral device matching a second profile of the second peripheral device.

16. An electronic device comprising:

at least one wireless communication circuit;

at least one sensor;

a flexible display; and at least one processor configured to electrically connect to the at least one wireless communication circuit, the at least one sensor, and the flexible display, wherein the at least one processor is configured to:

when a first area of the flexible display is activated, establish, using the at least one wireless communication circuit, a first wireless communication connection with a first peripheral device, when a second area of the flexible display is activated, establish, using the at least one wireless communication circuit, a second wireless communication connection with a second peripheral device, the second area being greater than the first area by folding, unfolding, or sliding, and in response to the second area of the flexible display being activated, establish the second wireless communication connection with the second peripheral device without a user input.

17. The electronic device of claim 16, wherein the at least one processor is further configured to:

in response to the second area of the flexible display being activated and the first area of the flexible display being activated, release the second wireless communication connection with the second peripheral device, wherein the second peripheral device is not configured to establish the second wireless communication connection when the first area of the flexible display is activated.

18. The electronic device of claim 16, wherein the at least one processor is further configured to:

in response to the second area of the flexible display being activated, release the first wireless communication connection of the first peripheral device, and establish the second wireless communication connection with the second peripheral device, a first profile of the first peripheral device matching a second profile of the second peripheral device.

19. The electronic device of claim 16, wherein the at least one processor is further configured to:

in response to the second area of the flexible display being activated, identify whether the second peripheral device has established a third wireless communication connection with an external electronic device, and in response to identifying that the second peripheral device establishes the third wireless communication connection with the external electronic device, cause the third wireless communication connection between the second peripheral device and the external electronic device to be released.

20. The electronic device of claim 16, wherein the at least one processor is further configured to:

in response to the first area of the flexible display being activated, perform a first operation in response to obtaining a first user input from an external device that is interlocked with the electronic device, and in response to the second area of the flexible display being activated, perform a second operation in response to obtaining the first user input from the external device, the second operation being different to the first operation.

* * * * *